US011432337B2

(12) United States Patent
Höglund et al.

(10) Patent No.: US 11,432,337 B2
(45) Date of Patent: Aug. 30, 2022

(54) ALLOWANCE OF SUBSEQUENT DATA FOR EARLY DATA TRANSMISSION

(71) Applicant: Telefonaktiebolaget LM Ericsson (publ), Stockholm (SE)

(72) Inventors: Andreas Höglund, Solna (SE); Dung Pham Van, Upplands Väsby (SE); Magnus Stattin, Upplands Väsby (SE); Tuomas Tirronen, Helsinki (FI); Emre Yavuz, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/046,414

(22) PCT Filed: Mar. 26, 2019

(86) PCT No.: PCT/EP2019/057632
§ 371 (c)(1),
(2) Date: Oct. 9, 2020

(87) PCT Pub. No.: WO2019/201563
PCT Pub. Date: Oct. 24, 2019

(65) Prior Publication Data
US 2021/0045162 A1 Feb. 11, 2021

Related U.S. Application Data

(60) Provisional application No. 62/659,038, filed on Apr. 17, 2018.

(51) Int. Cl.
*H04W 74/08* (2009.01)
*H04L 47/36* (2022.01)
(Continued)

(52) U.S. Cl.
CPC ........ *H04W 74/0833* (2013.01); *H04L 47/36* (2013.01); *H04W 48/10* (2013.01);
(Continued)

(58) Field of Classification Search
CPC ........ H04W 72/1268; H04W 72/1278; H04W 72/1284; H04W 72/14; H04W 76/27;
(Continued)

(56) References Cited

U.S. PATENT DOCUMENTS 10,616,886 B2   4/2020   Marinier et al.
10,779,333 B2   9/2020   Ye et al.
(Continued)

FOREIGN PATENT DOCUMENTS

WO   2018062957 A1   4/2018
WO   2018174577 A1   9/2018
(Continued)

OTHER PUBLICATIONS

Qualcomm Incorporated, Physical Layer Aspects of Data Transmission During Random Access Procdure, 3GPP Tsg Ran WG1 Meeting #92bis R1 -1804921, April 16-Apr. 2018 (Year: 2018).*
(Continued)

*Primary Examiner* — Nam T Huynh
(74) *Attorney, Agent, or Firm* — Coats + Bennett, PLLC

(57) ABSTRACT

A base station (110) transmits system information that indicates to a wireless device (120) that the wireless device (120) is permitted to transmit respective blocks stored at the wireless device (120) during and after a random access procedure (200). The wireless device (120) performs the random access procedure (200) to the base station (110). The wireless device (120) transmits a first block of data stored at the wireless device (120) to the base station (110) during the random access procedure (200) while withholding a second block of data stored at the wireless device (120) from
(Continued)

500

PERFORMING A RANDOM ACCESS PROCEDURE TO A BASE STATION
510

TRANSMITTING A FIRST BLOCK OF DATA STORED AT THE WIRELESS DEVICE TO THE BASE STATION DURING THE RANDOM ACCESS PROCEDURE WHILE WITHHOLDING A SECOND BLOCK OF DATA STORED AT THE WIRELESS DEVICE FROM TRANSMISSION TO THE BASE STATION UNTIL AFTER COMPLETION OF THE RANDOM ACCESS PROCEDURE
520 transmission to the base station (110) until after completion of the random access procedure (200). The base station (110), receives the blocks of data during and after the random access procedure (200), respectively.

16 Claims, 18 Drawing Sheets

(51) Int. Cl.
    *H04W 48/10*     (2009.01)
    *H04W 74/00*     (2009.01)
    *H04W 4/70*     (2018.01)
    *H04W 72/14*     (2009.01)

(52) U.S. Cl.
    CPC ............ *H04W 74/004* (2013.01); *H04W 4/70* (2018.02); *H04W 72/14* (2013.01)

(58) Field of Classification Search
    CPC ... H04W 76/10; H04W 48/10; H04W 74/004; H04W 74/0833; H04W 72/0413; H04W 72/044; H04L 47/36
    See application file for complete search history.

(56) References Cited

U.S. PATENT DOCUMENTS

| | | | |
|---|---|---|---|
| 2019/0028905 A1* | 1/2019 | Veeramallu | ............ H04W 4/70 |
| 2020/0037345 A1* | 1/2020 | Ryoo | .................... H04W 76/10 |
| 2021/0058823 A1 | 2/2021 | Liu et al. | |
| 2021/0176788 A1 | 6/2021 | Shin et al. | |

FOREIGN PATENT DOCUMENTS

| | | | |
|---|---|---|---|
| WO | 2018185654 A1 | 10/2018 | |
| WO | 2018212699 A1 | 11/2018 | |
| WO | 2019145129 A1 | 1/2019 | |
| WO | 2019064261 A1 | 4/2019 | |

OTHER PUBLICATIONS

3rd Generation Partnership Project, "3rd Generation Partnership Project; Technical Specification Group Radio Access Network; Evolved Universal Terrestrial Radio Access (E-UTRA); Physical layer procedures (Release 15)", Technical Specification, 3GPP TS 36.213 V15.0.0, Dec. 1, 2017, pp. 1-493, 3GPP, France.
3rd Generation Partnership Project, "3rd Generation Partnership Project; Technical Specification Group Radio Access Network; Evolved Universal Terrestrial Radio Access (E-UTRA); Medium Access Control (MAC) protocol specification (Release 15)", Technical Specification, 3GPP TS 36.321 V15.0.0, Dec. 1, 2017, pp. 1-109, 3GPP, France.
3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 15)", Technical Specification, 3GPP TS 36.331 V15.0.1, Jan. 1, 2018, pp. 1-776, 3GPP, France.
3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Technical Specification, 3GPP TS 36.300 V15.0.0, Dec. 1, 2017, pp. 1-338, 3GPP, France.

Ericsson, "Early data transmission for MTC", Early data transmission for MTC, Early data transmission for MTC, Nov. 27, 2017, pp. 1-5, R1-1719350, 3GPP.
Mediatek Inc., "On NB-loT EDT indication via PRACH", 3GPP TSG RAN WG2 Meeting #100, Reno, Nevada, USA, Nov. 27, 2017, pp. 1-5, R2-1713679, 3GPP.
Sierra Wireless S.A., "PRACH for EDT requests", 3GPP TSG-RAN WG2 #100, Reno, Nevada, USA, Nov. 27, 2017, pp. 1-4, R2-1713862, 3GPP.
The European Telecommunications Standards Institute, "LTE; Evolved Universal Terrestrial Radio Access (E-UTRA); Radio Resource Control (RRC); Protocol specification (3GPP TS 36.331 version 14.4.0 Release (14)", ETSI TS 136 331 V14.4.0, Oct. 1, 2017, pp. 1-761, ETSI, France.
LG Electronics, "Data transmission during random access procedure in NB-loT", 3GPP TSg RAN WG1 Meeting #88bis, Spokane, USA, Apr. 3, 2017, pp. 1-6, R1-1704853, 3GPP.
Wi Rapporteur (Ericsson), "RAN1 agreements for Rel-15 Further NB-loT enhancements", 3GPP TSG-RAN WG1 Meeting #91, Reno, USA, Nov. 27, 2017, pp. 1-12, R1-1721314, 3GPP.
Ericsson, "TB sizes and UL grant for Msg3", 3GPP TSG-RAN WG2 #101, Athens, Greece, Feb. 26, 2018, pp. 1-7, R2-1803080, 3GPP.
Ericsson, "[99bis#53][MTC/NB-loT] EDT indication via PRACH", 3GPP TSG-RAN WG2 #100, Reno, Nevada, USA, Nov. 27, 2017, pp. 1-30, R2-1713057, 3GPP.
MCC Support, "Final Report of 3GPP TSG RAN WG1 #90bis v1.0.0 (Prague, Czech Rep, Oct. 9-13, 2017)", 3GPP TSG RAN WG1 Meeting #91, Reno, Nevada, USA, Nov. 27, 2017, pp. 1-206, R1-1719301, 3GPP.
Huawei, et al. "Introduction of EDT for eMTC and NB-loT enhancements", 3GPP TSG-RAN2 Meeting #101, Athens, Greece, Feb. 26, 2018, pp. 1-56, R2-1803443, 3GPP.
Shan, B. et al., "Reply LS to RAN1 on early data transmission", 3GPP TSG RAN WG2 Meeting #101, Athens, Greece, Feb. 26, 2018, pp. 1-2, R2-1803884, 3GPP.
3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 15)", Technical Specification, 3GPP TS 36.331 V15.1.0, pp. 1-786, 3GPP, France.
Qualcomm Incorporated, "Physical Layer Aspects of Data Transmission During Random Access Procedure", 3GPP TSG RAN WG1 Meeting #92bis, Sanya, China, Apr. 16, 2018, pp. 1-5, R1-1804921, 3GPP.
ZTE, "Consideration on early data transmission in FeNB-loT", 3GPP TSG-RAN WG2 Meeting#99, Berlin, Germany, Aug. 21, 2017, pp. 1-11, R2-1707805, 3GPP.
3rd Generation Partnership Project, "3rd Generation Partnership Project; Technical Specification Group Radio Access Network; Evolved Universal Terrestrial Radio Access (E-UTRA); Physical layer procedures (Release 15)", Technical Specification, 3GPP TS 36.213 V15.1.0, Mar. 1, 2018, pp. 1-609, 3GPP.
Huawei, et al., "Introduction of EDT for eMTC and NB-loT enhancements", 3GPP TSG-RAN2 Meeting #101 bis, Sanya, China, Apr. 16, 2018, pp. 1-68, R2-1804331.
3rd Generation Partnership Project, "3rd Generation Partnership Project; Technical Specification Group Radio Access Network; Evolved Universal Terrestrial Radio Access (E-UTRA); Medium Access Control (MAC) protocol specification (Release 15)", Technical Specification, 3GPP TS 36.321 V15.1.0, Mar. 1, 2018, pp. 1-109, 3GPP, France.

* cited by examiner

| EXAMPLE DCI CONTENTS | | |
|---|---|---|
| DCI contents | CE mode A | CE mode B |
| Msg3 PUSCH narrowband index | $N_{NB}^{index}$ | 2 |
| Msg3 PUSCH Resource allocation | 4 | 3 |
| Number of Repetitions for Msg3 PUSCH | 2 | 3 |
| MCS | 3 | 0 |
| TBS | 0 | 2 |
| TPC | 3 | 0 |
| CSI request | 1 | 0 |
| UL delay | 1 | 0 |
| Msg3/4 MPDCCH narrowband index | 2 | 2 |
| Zero padding | $4 - N_{NB}^{index}$ | 0 |
| Total Nr-bits | 20 | 12 |

FIG. 20A

```
-- ASN1START

PRACH-ConfigSIB ::= SEQUENCE
{
   rootSequenceIndex   INTEGER (0..837),
   prach-ConfigInfo    PRACH-ConfigInfo
}

PRACH-ConfigSIB-v1310 ::= SEQUENCE
{
   rsrp-ThresholdsPrachInfoList-r13   RSRP-ThresholdsPrachInfoList-r13,
   mpdcch-startSF-CSS-RA-r13 CHOICE
   {
      fdd-r13 ENUMERATED {v1, v1dot5, v2, v2dot5, v4, v5, v8, v10},
      tdd-r13 ENUMERATED {v1, v2, v4, v5, v8, v10, v20, spare}
   }  OPTIONAL, -- Cond MP
   prach-HoppingOffset-r13   INTEGER (0..94) OPTIONAL, -- Need OR
   prach-ParametersListCE-r13   PRACH-ParametersListCE-r13
}

PRACH-ConfigSIB-v15xy ::= SEQUENCE
{
   edt-PRACH-ParametersListCE-r15   SEQUENCE (SIZE(1..maxCE-Level-r13))
      OF EDT-PRACH-ParametersCE-r15
}

PRACH-Config ::= SEQUENCE
{
   rootSequenceIndex   INTEGER (0..837),
   prach-ConfigInfo    PRACH-ConfigInfo    OPTIONAL   -- Need ON
}

PRACH-Config-v1310 ::= SEQUENCE
{
  rsrp-ThresholdsPrachInfoList-r13 RSRP-ThresholdsPrachInfoList-r13   OPTIONAL,
    -- Cond MP
  mpdcch-startSF-CSS-RA-r13        CHOICE
  {
      fdd-r13 ENUMERATED {v1, v1dot5, v2, v2dot5, v4, v5, v8, v10},
      tdd-r13 ENUMERATED {v1, v2, v4, v5, v8, v10, v20, spare}
  } OPTIONAL,    -- Cond MP
  prach-HoppingOffset-r13    INTEGER (0..94) OPTIONAL,           -- Need OR
  prach-ParametersListCE-r13 PRACH-ParametersListCE-r13 OPTIONAL, -- Cond MP
  initial-CE-level-r13    INTEGER (0..3)     OPTIONAL            -- Need OR
}

PRACH-Config-v1430 ::= SEQUENCE
{
   rootSequenceIndexHighSpeed-r14             INTEGER (0..837),
   zeroCorrelationZoneConfigHighSpeed-r14     INTEGER (0..12),
   prach-ConfigIndexHighSpeed-r14             INTEGER (0..63),
   prach-FreqOffsetHighSpeed-r14              INTEGER (0..94)
}
```

```
PRACH-ConfigSCell-r10 ::= SEQUENCE {
   prach-ConfigIndex-r10          INTEGER (0..63)
}

PRACH-ConfigInfo ::=   SEQUENCE {
   prach-ConfigIndex              INTEGER (0..63),
   highSpeedFlag                  BOOLEAN,
   zeroCorrelationZoneConfig      INTEGER (0..15),
   prach-FreqOffset               INTEGER (0..94)
}

PRACH-ParametersListCE-r13 ::=  SEQUENCE (SIZE(1..maxCE-Level-r13))
    OF PRACH-ParametersCE-r13

PRACH-ParametersCE-r13 ::=   SEQUENCE
{
  prach-ConfigIndex-r13   INTEGER (0..63),
  prach-FreqOffset-r13    INTEGER (0..94),
  prach-StartingSubframe-r13 ENUMERATED
      {sf2, sf4, sf8, sf16, sf32, sf64, sf128, sf256} OPTIONAL,  -- Need OP
  maxNumPreambleAttemptCE-r13            ENUMERATED
      {n3, n4, n5, n6, n7, n8, n10} OPTIONAL,                    -- Need OP
  numRepetitionPerPreambleAttempt-r13 ENUMERATED
      {n1,n2,n4,n8,n16,n32,n64,n128},
  mpdcch-NarrowbandsToMonitor-r13  SEQUENCE (SIZE(1..2)) OF INTEGER
      (1..maxAvailNarrowBands-r13),
  mpdcch-NumRepetition-RA-r13            ENUMERATED
      {r1, r2, r4, r8, r16, r32, r64, r128, r256},
  prach-HoppingConfig-r13                ENUMERATED   {on,off}
}

EDT-PRACH-ParametersCE-r15 ::=     SEQUENCE
{
   prach-ConfigIndex-r15          INTEGER (0..63),
   prach-FreqOffset-r15           INTEGER (0..94),
   prach-StartingSubframe-r15     ENUMERATED
      {sf2, sf4, sf8, sf16, sf32, sf64, sf128, sf256}OPTIONAL,   -- Need OP
   mpdcch-NarrowbandsToMonitor-r15 SEQUENCE (SIZE(1..2)) OF INTEGER
      (1..maxAvailNarrowBands-r13),
   subsequentDataFlag             BOOLEAN
}

RSRP-ThresholdsPrachInfoList-r13 ::= SEQUENCE (SIZE(1..3)) OF RSRP-Range

-- ASN1STOP
```

FIG. 20B

```
-- ASN1START

NPRACH-ConfigSIB-NB-r13 ::=   SEQUENCE
{
    nprach-CP-Length-r13        ENUMERATED {us66dot7, us266dot7},
    rsrp-ThresholdsPrachInfoList-r13 RSRP-ThresholdsNPRACH-InfoList-NB-r13
    OPTIONAL, -- need OR
    nprach-ParametersList-r13    NPRACH-ParametersList-NB-r13
}

NPRACH-ConfigSIB-NB-v1330 ::=   SEQUENCE
{
    nprach-ParametersList-v1330       NPRACH-ParametersList-NB-v1330
}

NPRACH-ConfigSIB-NB-v1450 ::=   SEQUENCE
{
    maxNumPreambleAttemptCE-r14   ENUMERATED
        {n3, n4, n5, n6, n7, n8, n10, spare1}
}

NPRACH-ConfigSIB-NB-v15xy ::=   SEQUENCE
{
    tbs-InfoList-EDT-r15              TBS-InfoList-EDT-NB-r15,
    nprach-ParametersList-EDT-r15     SEQUENCE
    {
        nprach-ParametersList-r15     NPRACH-ParametersList-NB-r13,
        nprach-NumCBRA-StartSubcarriers-r15 NPRACH-ParametersList-NB-v1330,
        subsequentDataFlag            BOOLEAN
    } OPTIONAL     -- Cond EDT
}

NPRACH-ParametersList-NB-r13 ::= SEQUENCE (SIZE (1.. maxNPRACH-Resources-NB-r13))
    OF NPRACH-Parameters-NB-r13

NPRACH-ParametersList-NB-v1330 ::= SEQUENCE (SIZE (1.. maxNPRACH-Resources-NB-r13))
    OF NPRACH-Parameters-NB-v1330
```

FIG. 21A

```
NPRACH-Parameters-NB-r13::=      SEQUENCE
{
    nprach-Periodicity-r13                  ENUMERATED
        {ms40, ms80, ms160, ms240, ms320, ms640, ms1280, ms2560},
    nprach-StartTime-r13                    ENUMERATED
        {ms8, ms16, ms32, ms64, ms128, ms256, ms512, ms1024},
    nprach-SubcarrierOffset-r13             ENUMERATED
        {n0, n12, n24, n36, n2, n18, n34, spare1},
    nprach-NumSubcarriers-r13               ENUMERATED
        {n12, n24, n36, n48},
    nprach-SubcarrierMSG3-RangeStart-r13    ENUMERATED
        {zero, oneThird, twoThird, one},
    maxNumPreambleAttemptCE-r13             ENUMERATED
        {n3, n4, n5, n6, n7, n8, n10, spare1},
    numRepetitionsPerPreambleAttempt-r13    ENUMERATED
        {n1, n2, n4, n8, n16, n32, n64, n128},
    npdcch-NumRepetitions-RA-r13            ENUMERATED
        {r1, r2, r4, r8, r16, r32, r64, r128, r256, r512,
        r1024, r2048, spare4, spare3, spare2, spare1},
    npdcch-StartSF-CSS-RA-r13               ENUMERATED
        {v1dot5, v2, v4, v8, v16, v32, v48, v64},
    npdcch-Offset-RA-r13                    ENUMERATED
        {zero, oneEighth, oneFourth, threeEighth}
}

NPRACH-Parameters-NB-v1330 ::=    SEQUENCE
{
    nprach-NumCBRA-StartSubcarriers-r13     ENUMERATED
        {n8, n10, n11, n12, n20, n22, n23, n24,
        n32, n34, n35, n36, n40, n44, n46, n48}
}

RSRP-ThresholdsNPRACH-InfoList-NB-r13 ::= SEQUENCE (SIZE(1..2)) OF RSRP-Range

TBS-InfoList-EDT-NB-r15 ::=  SEQUENCE (SIZE (1.. maxNPRACH-Resources-NB-r13))
    OF TBS-EDT-NB-r15

TBS-EDT-NB-r15 ::= ENUMERATED
    {value1TBD, value2TBD, value3TBD, value4TBD,
    value5TBD, value6TBD, value7TBD, value8TBD}

-- ASN1STOP
```

ALLOWANCE OF SUBSEQUENT DATA FOR EARLY DATA TRANSMISSION

RELATED APPLICATIONS

This application claims priority to U.S. Provisional Patent Application Ser. No. 62/659,038, filed 17 Apr. 2018, the entire contents of which are incorporated by reference herein.

TECHNICAL FIELD

The present disclosure generally relates to the field of wireless communication networks, and more particularly to transferring data between a wireless device and a base station during random access.

BACKGROUND

Third Generation Partnership Project (3GPP) has worked on specifying technologies to cover Machine-to-Machine (M2M) and/or Internet of Things (IoT) related use cases. Most recent work for 3GPP Release 13 and 14 includes enhancements to support Machine-Type Communications (MTC) with new User Equipment (UE) categories (Category M1 (Cat-M1), Category M2 (Cat-M2)), supporting reduced bandwidth of up to 6 and 24 physical resource blocks (PRBs), and Narrowband Internet of Things (NB-IoT) UEs providing a new radio interface (and UE categories Category NB1 (Cat-NB1) and Category NB2 (Cat-NB2)).

The present disclosure will refer to the Long Term Evolution (LTE) enhancements introduced in 3GPP Release 13, 14, and 15 for MTC as "eMTC." Such enhancements include (but are not limited to) support for bandwidth limited UEs, Cat-M1, and support for coverage enhancements (CEs). In particular, the term eMTC is used to separate discussion of its features from those of NB-IoT (which is a term used herein that may pertain to any Release), although the features supported by each may be similar in certain respects. Another name for variants of LTE developed for M2M applications is LTE-M.

For both eMTC and NB-IOT, Cellular IoT (CIoT) Evolved Packet System (EPS) User Plane (UP) optimization and CIoT EPS Control Plane (CP) optimization signaling reductions were also introduced in Rel-13. The former, here referred to as the UP-solution, allows the UE to resume a previously stored Radio Resource Control (RRC) connection (thus also known as RRC Suspend/Resume). The latter, here referred to as CP-solution, allows the transmission of user-plane Data over Non-Access Stratum (NAS) (DoNAS).

As these various technologies develop, it may be advantageous (e.g., for eMTC and/or NB-IoT, possibly beginning with 3GPP Release 15) to pursue reducing UE power consumption and latency.

SUMMARY

Embodiments of the present disclosure allowing data to be sent during the Random Access (RA) procedure, e.g., in order to reduce UE power consumption and/or latency.

More specifically, embodiments of the present disclosure include a method of data transmission performed by a wireless device. The method comprises performing a random access procedure to a base station. The method further comprises transmitting a first block of data stored at the wireless device to the base station during the random access procedure while withholding a second block of data stored at the wireless device from transmission to the base station until after completion of the random access procedure.

In some embodiments, the method further comprises transmitting the second block of data after the completion of the random access procedure.

In some embodiments, the method further comprises selecting a random access preamble that indicates to the base station that the wireless device will perform the transmitting during the random access procedure.

In some embodiments, the method further comprises receiving system information from the base station indicating that transmitting respective blocks of data during and after the random access procedure is permitted. In some such embodiments the system information comprises information elements specifying a configuration of a Physical Random Access Channel (PRACH) or Narrowband PRACH (NPRACH). In some such embodiments the information elements comprise a Boolean flag set to a predetermined value to indicate that the transmitting of the respective blocks of data during and after the random access procedure is permitted. In some such embodiments, the Boolean flag is one of a plurality of Boolean flags comprised in the information elements, each of the Boolean flags corresponding to a respective coverage enhancement level and indicating whether or not, at the corresponding coverage enhancement level, the wireless device is permitted to transmit the respective blocks during and after the random access procedure. In some embodiments the system information further indicates a maximum transmission block size for the transmitting. In some such embodiments, the transmitting is responsive to determining that the first and second blocks of data are collectively larger than the maximum transmission block size.

In some embodiments, the method further comprises, during the random access procedure, transmitting a size of the second block of data to the base station. In some such embodiments, the method further comprises, responsive to the transmitting of the size of the second block during the random access procedure, receiving instruction from the base station to proceed directly to an RRC_CONNECTED state upon completing the random access procedure.

In some embodiments, the method further comprises providing user data, and forwarding the user data to a host computer via the transmission to the base station.

Other embodiments include a method of receiving data, during a random access procedure, performed by a base station. The method comprises transmitting system information that indicates to a wireless device that the wireless device is permitted to transmit respective blocks stored at the wireless device during and after random access procedure. The method further comprises responsive to the transmitting, receiving the blocks of data during and after the random access procedure, respectively.

In some embodiments, the method further comprises receiving a random access preamble from the wireless device that indicates to the base station that the wireless device transmit the blocks of data during and after the random access procedure, respectively.

In some embodiments, the system information comprises information elements specifying a configuration of a Physical Random Access Channel (PRACH) or Narrowband PRACH (NPRACH). In some such embodiments, the information elements comprise a Boolean flag set to a predetermined value to indicate to the wireless device that the wireless device is permitted to transmit the respective blocks during and after the random access procedure. In some such embodiments, the Boolean flag is one of a plurality of Boolean flags comprised in the information elements, each of the Boolean flags corresponding to a respective coverage enhancement level and indicating whether or not, at the corresponding coverage enhancement level, the wireless device is permitted to transmit the respective blocks during and after the random access procedure.

In some embodiments, the system information further indicates a maximum transmission block size for the block of data received during the random access procedure. In some such embodiments, the first and second blocks of data are collectively larger than the maximum transmission block size.

In some embodiments, the method further comprises, during the random access, receiving a size of the block of data to be received after the random access procedure. In some such embodiments, the method further comprises, responsive to the receiving of the size of the second block during the random access, instructing the wireless device to proceed directly to an RRC_CONNECTED state upon completing the random access procedure.

In some embodiments, the method further comprises obtaining user data, and forwarding the user data to a host computer or a wireless device.

Other embodiments include a wireless device configured to perform a random access procedure to a base station. The wireless device is further configured to transmit a first block of data stored at the wireless device to the base station during the random access procedure while withholding a second block of data stored at the wireless device from transmission to the base station until after completion of the random access procedure.

In some embodiments, the wireless device comprises a processor and a memory. The memory contains instructions executable by the processor whereby the wireless device is configured to perform the random access procedure and to perform the transmitting.

In some embodiments, the wireless device is configured to perform any of the wireless device methods described above.

Other embodiments include a base station configured to transmit system information that indicates to a wireless device that the wireless device is permitted to transmit respective blocks stored at the wireless device during and after random access procedure. The base station is further configured to, responsive to the transmitting, receive the blocks of data during and after the random access procedure, respectively.

In some embodiments, the base station comprises a processor and a memory. The memory contains instructions executable by the processor whereby the base station is configured to perform the transmitting and the receiving.

In some embodiments, the base station is configured to perform any of the base station methods described above.

Other embodiments include a computer program comprising instructions which, when executed on at least one processor of a radio node (e.g., a wireless device or base station), cause the at least one processor to carry out any of the methods described above.

Other embodiments include a carrier containing the computer program of the preceding claim, wherein the carrier is one of an electronic signal, optical signal, radio signal, or computer readable storage medium.

Any of the embodiments described above may further comprise one or more of the features described below.

BRIEF DESCRIPTION OF THE FIGURES

FIGS. 20A and 20B together illustrate an example of PRACH-Config information elements, expressed in Abstract Syntax Notation One (ASN.1), according to one or more embodiments of the present disclosure.

FIGS. 21A and 21B together illustrate an example of NPRACH-ConfigSIB-NB information elements, expressed in ASN.1, according to one or more embodiments of the present disclosure.

DETAILED DESCRIPTION

Figure 1:
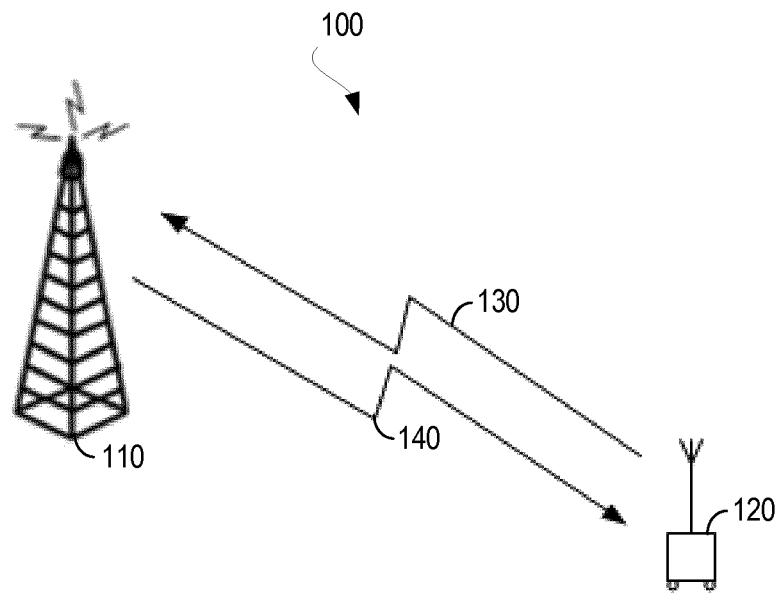
FIG. 1 is a schematic diagram illustrating an example communication system according to one or more embodiments of the present disclosure.

FIG. 1 illustrates an example communication system 100 according to one or more embodiments of the present disclosure. The communication system 100 comprises a wireless device 120 and base station 110 that wirelessly communicate with each other using an uplink (UL) 130 and a downlink (DL) 140. According to embodiments the base station 110 may be an access node (e.g., an eNodeB (eNB)) that provides the wireless device 120 with access to a network and/or the wireless device 120 may be a mobile terminal, an NB-IoT UE, and/or other radio node.

The base station 110 provides uplink and downlink grants to the wireless device 120. An uplink grant provides the wireless device 120 with scheduling information to use when transmitting on the uplink 130, and the wireless device 120 transmits on the uplink 130 in accordance with the uplink grant. A downlink grant provides the wireless device 120 with scheduling information that describes when a data transmission from the base station 110 may be expected. An uplink or downlink grant may also be referred to as an uplink or downlink assignment, respectively.

The wireless device 120 may need to contact the network (e.g., via the base station 110) without having a dedicated resource in the uplink 130. To handle this, a random access procedure may be available so that such a wireless device 120 may transmit a signal to the base station 110, despite not having this dedicated resource.

Embodiments of the present disclosure appreciate that it may be worthwhile to evaluate power consumption/latency gain and specify necessary support for DL/UL data transmission on a dedicated resource during the RA procedure (e.g., after Physical Random Access Channel (PRACH) and/or Narrowband PRACH (NPRACH) transmission and before the RRC connection setup is completed) in order to reduce UE power consumption and/or latency. The RRC Suspend/Resume case may particularly worthwhile to consider in this regard.

Figure 2:
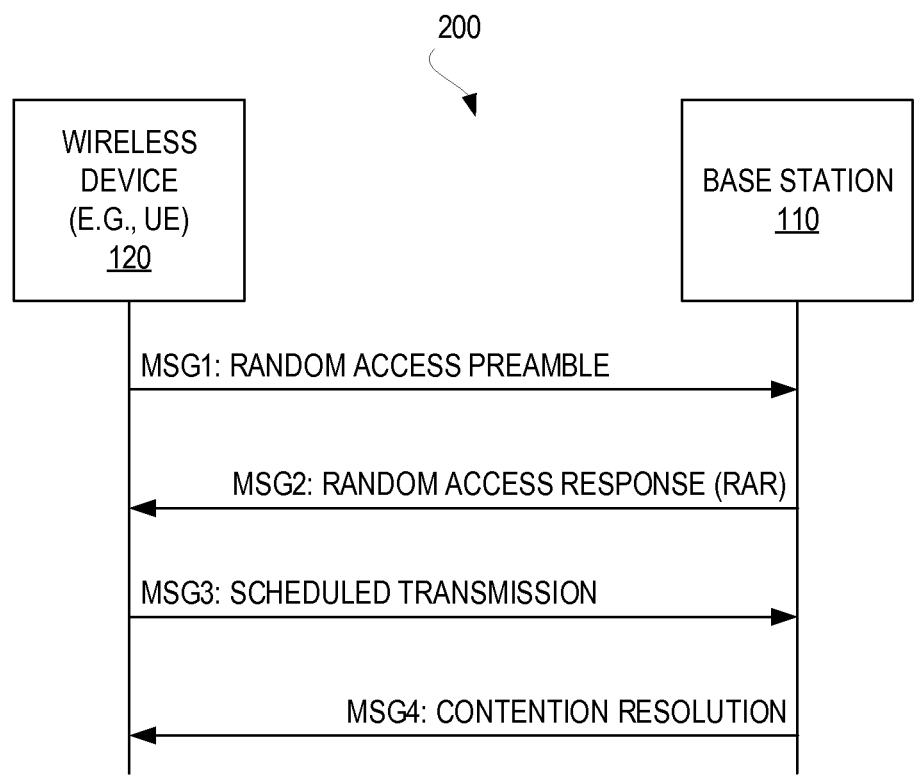
FIG. 2 is a signaling diagram illustrating an example random access procedure, according to one or more embodiments of the present disclosure.

A random access (RA) procedure enables a wireless device 120 to access a wireless communication network. The messages in a common RA procedure are commonly referred to as message 1 (Msg1) through message 4 (Msg4). An example RA procedure 200 is illustrated in FIG. 2. In this particular example, the RA procedure 200 is contention-based.

The first message of this procedure (e.g., as illustrated in FIG. 2) is typically transmitted by the wireless device 120 on a special resource reserved for random access known as a PRACH. The resources available for PRACH transmission may be provided to UEs as part of broadcasted system information (or as part of dedicated RRC signaling in case of e.g. handover).

Approaches to support early data transmission (EDT) may include support for early UL data transmission in Msg4 for Rel-13 UP solution. EDT may be enabled for UL Msg3 only, or DL Msg4 only, or both Msg3 and Msg4 depending on actual use cases. The wireless device 120 may indicate its intention of using EDT by the way it selects the preamble in Msg1. However, this may require some form of preamble partitioning, which may have a negative impact on (N)PRACH performance.

Preamble and PRACH resource partitioning/configuration and indication of Msg3 data sizes may include the wireless device 120 initiating EDT in Msg1 when the size of Msg3 (including the user data which wireless device 120 intends to transmit) is equal or smaller than the maximum possible transport block size (TBS) for Msg3 broadcast per CE. Additionally or alternatively, PRACH partitioning for EDT indication may be configured per enhanced coverage level.

Radio communication between the base station 110 and the wireless device 120 may be performed using radio resources across a time and frequency domain. For example, NB-IoT may use Orthogonal Frequency-Division Multiplexing (OFDM) in the downlink 140 and Discrete Fourier Transform (DFT) spread OFDM in the uplink 130.

Figures 3, 4:
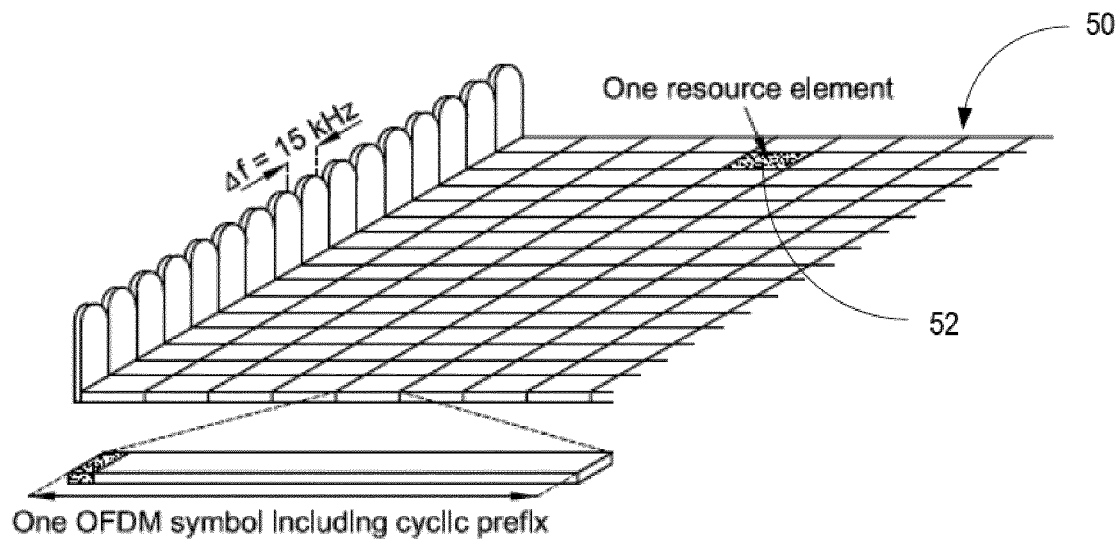
FIG. 3 is a schematic diagram illustrating an example time-frequency grid according to one or more embodiments of the present disclosure.
FIG. 4 is a table illustrating an example of downlink control information according to one or more embodiments of the present disclosure.

A basic downlink physical resource may be viewed as a time-frequency grid 50. FIG. 3 illustrates a portion of an example OFDM time-frequency grid. According to this example, the time-frequency grid is divided into one millisecond subframes. Each subframe includes a number of OFDM symbols. For a normal cyclic prefix length, suitable for use in situations where multipath dispersion is not expected to be extremely severe, a subframe may comprise fourteen OFDM symbols. A subframe may comprise twelve OFDM symbols if an extended cyclic prefix is used. In the frequency domain, the physical resources shown in FIG. 3 are divided into adjacent subcarriers with a spacing of 15 kHz. The number of subcarriers may vary according to the allocated system bandwidth. The smallest element of the time-frequency grid is typically referred to as a resource element 52, which comprises one OFDM subcarrier during one OFDM symbol interval. One way to identify a particular resource element 52 within a subframe is by its time-position (i.e., t-position) and frequency-position (i.e., f-position) in the grid.

NB-IoT may use a similar time-frequency grid for the downlink, e.g., including twelve 15 kHz adjacent subcarriers for a total of 180 kHz. According to NB-IoT, a resource unit (RU) is a unit that maps to a transport block. The dimensions of an RU may vary depending on the (N)PUSCH format and subcarrier spacing. For example, when using NPUSCH format 1 with 3.75 kHz subcarrier spacing, an RU may be one subcarrier wide and 16 time slots long. Other NPUSCH formats and/or subcarrier spacings may use differently sized RUs.

In general, various embodiments may include or exclude certain features. For example, some embodiments may support segmentation, while others do not. Indeed, support for segmentation may not be a priority in some embodiments. In some embodiments, PRACH resource partitioning may not be supported to indicate the intended data size other than legacy or maximum TBS broadcast per CE. According to one or more embodiments, UE category is not indicated in Msg1. Further, according to one or more embodiments, for EDT indication, PRACH resources may be configured as in legacy eMTC or NB-IoT with respect to physical layer resources, preambles/subcarriers. The PRACH resource pool, i.e., physical layer resources, preambles/subcarriers, for EDT indication may be separate from PRACH resource pool for legacy RACH procedure.

In some embodiments, the LTE-M grant included in the Random Access Response (RAR) for Msg3 transmission may include the example downlink control information (DCI) contents shown in FIG. 4, and/or may be specified in 3GPP TS 36.213 V15.1.0, for example.

Additionally or alternatively, the grant included in RAR for Msg3 transmission may be according to the following example section 16.3.3 or may be found, e.g., in 3GPP TS 36.213:

16.3.3 Narrowband Random Access Response Grant

The higher layers indicate the Nr-bit UL Grant to the physical layer, as defined in 3GPP TS 36.321.

This is referred to as the Narrowband Random Access Response Grant in the physical layer.

Nr-bit=15, and the content of these 15 bits starting with the MSB and ending with the LSB are as follows:
  Uplink subcarrier spacing $\Delta f$ is '0'=3.75 kHz or '1'=15 kHz-1 bit
  Subcarrier indication field $I_{SC}$ as determined in Subclause 16.5.1.1-6 bits
  Scheduling delay field ($I_{Delay}$) as determined in Subclause 16.5.1 with $k_0$=12 for $I_{Delay}$=0, where NB-IoT DL subframe n is the last subframe in which the NPDSCH associated with the Narrowband Random Access Response Grant is transmitted—2 bits
  Msg3 repetition number $N_{Rep}$ as determine in Subclause 16.5.1.1-3 bits
  MCS index indicating TBS, modulation, and number of RUs for Msg3 according to Table 16.3.3-1-3 bits
  The redundancy version for the first transmission of Msg3 is 0.

Moreover, certain embodiments may address certain uncertainties with respect to how padding of Msg3 is performed. For example, in certain embodiments in which the UL data size is very small, Msg3 transmission may need to include a relatively large amount of padding. In general, padding may be done at the Medium Access Control (MAC) sub-layer in the process of (re)building MAC Protocol Data Unit (PDU) for Msg3. The UE's MAC sub-layer may (re)build a Msg3 PDU according to corresponding UL grant(s) the wireless device 120 has received.

For example, the wireless device 120 may be provided with an UL grant in Msg2, i.e., RAR message to transmit Msg3. The MAC sub-layer may then build a Msg3 PDU based on data from CCCH logical channel submitted by the RLC sub-layer and then store it in the Msg3 buffer. The MAC entity may obtain the PDU from Msg3 buffer and instruct the PHY layer to generate a transmission of Msg3 according to the received UL grant. Once the wireless device 120 transmits Msg3, it starts a timer (e.g., mac Contention-ResolutionTimer) and monitors the Physical Downlink Control Channel (PDCCH) (or Narrowband PDCCH (NPDCCH)) for receiving either Msg4 or a UL grant for Msg3 retransmission. In the case where the contention resolution in Msg4 is considered unsuccessful, the wireless device 120 may restart the RA procedure. Note that in subsequent RA attempts, the wireless device 120 may obtain the Msg3 PDU from Msg3 buffer for transmission rather than building a new one. In case of Msg3 retransmission the eNB may send the wireless device 120 a new UL grant via (N)PDCCH rather than a Msg4 (before the mac-ContentionResolutionTimer expires). The wireless device 120 may additionally or alternatively obtain the PDU from Msg3 buffer for retransmission using the newly provided UL grant.

According to various embodiments of EDT, Msg3 MAC PDU may be larger or smaller than the provided UL grant. For example, the wireless device 120 may receive an UL grant in Msg2 and realize that the provided grant is not sufficient to accommodate the potential Msg3 PDU (i.e., including UL data). In some such embodiments, the wireless device 120 may fallback to transmitting legacy Msg3 in some embodiments. As another example, the UL grant may be larger compared to legacy Msg3 size, which may result in unnecessary waste of resources due to padding bits. Further, UL resources may be wasted when the UL grant is larger than needed to accommodate all pending UL data. In addition, a similar situation may also happen when the wireless device 120 receives a smaller or larger UL grant to (re)transmit the Msg3 PDU already stored in Msg3 buffer. Such padding issues may happen in CP EDT solutions, UP EDT solutions, or both.

There exist certain challenge(s). For example, two particular issues may arise in view of the size of an Msg3 grant as compared to the size of actual data to be transmitted in Msg3. The first of these issues may be due to the wireless device 120 being allocated with the actual data size being relatively much smaller (e.g., 100 bits) than what is granted for Msg3 transmission (e.g., 1000 bits), resulting in a payload of, e.g., 100 bits plus possible headers that would be padded up to 1000 bits, potentially resulting in longer transmission time (which may thereby be performed at relatively higher power consumption and/or latency, for example) and higher system resource consumption compared to what would be needed if the provided grant would be for smaller TBS. These issues are emphasized in deep coverage due to number of repetitions required. Indeed, uplink TX time may considerably affect UE power consumption.

The second particular issue that may arise may be due to the wireless device 120 being allocated with an UL grant larger than a legacy one but which is nonetheless not sufficient to accommodate the actual data size and the wireless device 120 falls back to performing in accordance with a legacy Msg3. Using a larger than required UL grant for legacy Msg3, padding is needed in Msg3 MAC PDU, resulting in higher power consumption (and latency) and system resource consumption compared to what would be needed if either a smaller UL grant were provided, or the wireless device 120 were to not fallback to legacy Msg3 (e.g., by using segmentation).

Different approaches to handling these problems may be taken depending on the radio technology involved in the communication. For example, an approach that may be suitable for NB-IoT may be to select from the Rel-13 NPUSCH TBS values. In such in any embodiment, it may be feasible to support 5 or more MCS/TBS/Resource Unit (RU) size combinations. This may, for example, allow for selection of a TBS value that reduces the need for wasteful padding and/or reduces transmission time, among other things.

Another example as may be appropriate for eMTC, for example, may be to select from the Rel-13 PUSCH TBS values, with the maximum TBS for early data transmission in Msg3 being 1000 bits for PRACH CE levels 0 and 1, and 936 bits for PRACH CE levels 2 and 3.

With respect to NB-IoT, the number of MCS/TBS/RU states that may be used for EDT may be chosen from a limited number of MCS/TBS/RU states. In some embodiments, a number of unused MCS/TBS/RU states may be used. Additionally or alternatively, a number of states supported by using spare bits from the RAR and/or SIB may be used. For example:

Alt. 0: 5 unused MCS/TBS/RU states and 0 bit in SIB

Alt. 1: As many as supported by using 1 spare bit from RAR and 0 bit in SIB

Alt. 2: As many as supported by using 2 spare bits from RAR and 0 bit in SIB

Alt. 3: As many as supported by using 2 bits in SIB and 0 spare bit in RAR

Alt. 4: As many as supported by using maximum TBS value in SIB and 0 spare bit in RAR Alt. 5: 1 spare bit in RAR used for new/modified UL grant and 0 bit in SIB In at least some embodiments (e.g., such as one or more embodiments that use alts 1-4), the uplink subcarrier spacing field, subcarrier indication field, scheduling delay field and Msg3 repetition number field in RAR UL Grant for uplink EDT in Msg3 may not need to be changed.

Other features of possible embodiments may include a protocol overhead (MAC/RLC/PDCP/RRC) for EDT that is 25 bytes for TBS evaluations, and/or a minimum possible TBS of around 320 bits based on the values in (N)PUSCH tables.

Particular embodiments may include a new UL grant format, which may or may not be backwards compatible, according to particular embodiments. Some embodiments in particular may use the same RAR format for EDT UEs.

Particular embodiments may additionally or alternatively include the EDT UL grant allowing the max TBS to be broadcasted in system information unless the provided UL grant is for legacy Msg3. In particular, the EDT UL grant may allow the wireless device 120 to choose an appropriate TBS, MCS, repetitions, and RUs (for NB-IoT) from a set of TB sizes provided based on the UL data.

In some embodiments, 8 possible candidate values for the maximum TBS are broadcasted in system information. For each maximum TB size broadcasted, up to 4 possible TBSs (i.e. blind decoding options) may be allowed. For eMTC in particular, the reserved bit in MAC RAR may be used for the EDT feature.

The maximum TBS broadcasted in system information may be selected from 8 values which are taken from the Rel-13 PUSCH tables. The up to 4 possible TBS may be smaller than or equal to the maximum broadcast TBS values for the wireless device 120 to choose among. In particular, the network may enable the use of TBS smaller than the maximum configured.

Moreover, NB-IoT and LTE-M may use similar approaches, taking into consideratin that one uses an NPUSCH and the other a PUSCH.

Despite these particular details which may be useful in improving EDT, there may yet remain certain challenge(s). For example, in EDT, data may be sent before contention is resolved (i.e., after Msg4). Accordingly, there may be a risk of a collision in the data transmission. This collision risk generally increases if there are many UEs using the EDT resources (e.g., dedicated EDT Msg1 preambles). Moreover, EDT might be used by UEs with more data to send (e.g., than can fit in Msg3 and/or Msg4).

To address such concerns, one approach may be to avoid use of EDT when there is subsequent data. This may allow the buffer status report (BSR) to be removed, e.g., by implicitly assuming that BSR=0 and that there is no more data to transmit after Msg3 when EDT is used. That said, taking this approach may cause a wireless device 120 that has more data to transmit (whether in the UL buffer before, or arriving after, first initializing the random access procedure 200), to have to start over with a second Msg1 transmission. Accordingly, this approach may be highly inefficient for both the network and the wireless device 120 in certain situations.

Certain aspects of the present disclosure and their embodiments may provide solutions to these or other challenges.

Discussed herein are one or more solutions in which the eNB may indicate whether subsequent data after the EDT procedure (i.e., after Msg3 and Msg4) is allowed in the cell. One approach may be to include the BSR in Msg3 for EDT, and a flag (e.g., 1 bit indication) in System Information that indicates whether inclusion of a BSR that is not equal to zero is allowed, thereby indicating that there is more data to transmit.

In particular, certain embodiments of EDT in which there is contention-based transmission of the payload may involve a risk for collision with other UEs, which can lead to high numbers of retransmission and congestion upon high load in a cell. Embodiments of the present disclosure introduce a dynamic way to switch on and off the Early Data Transmission in a cell (e.g. depending on load) to avoid this drawback.

Certain embodiments may provide one or more of the following technical advantage(s). For example, particular embodiments may enable the use of EDT even when the wireless device 120 has more data to transmit than can fit Msg3. The ability to use EDT even in these circumstances may improve UE and/or network performance since the wireless device 120 may not be required to start over with a second Msg1 transmission for transmitting the subsequent data.

In view of the embodiments above, the present disclosure generally includes the following embodiments, e.g., which may address one or more of the issues disclosed herein.

Figure 5:
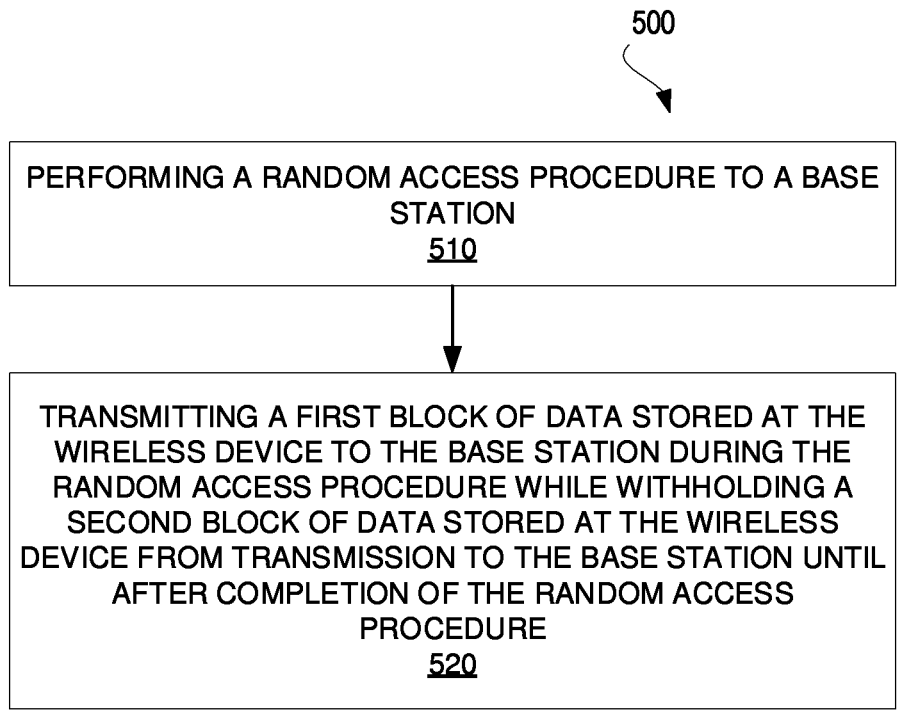
FIG. 5 is a flow diagram illustrating an example method implemented by a wireless device, according to one or more embodiments of the present disclosure.

FIG. 5 depicts a method 500 in accordance with particular embodiments. The method is performed by a wireless device 120 and includes performing a random access procedure 200 to a base station 110 (block 510). The method 500 further includes transmitting a first block of data stored at the wireless device 120 to the base station 110 during the random access procedure 200 while withholding a second block of data stored at the wireless device 120 from transmission to the base station 110 until after completion of the random access procedure 200 (block 520).

Figure 6:
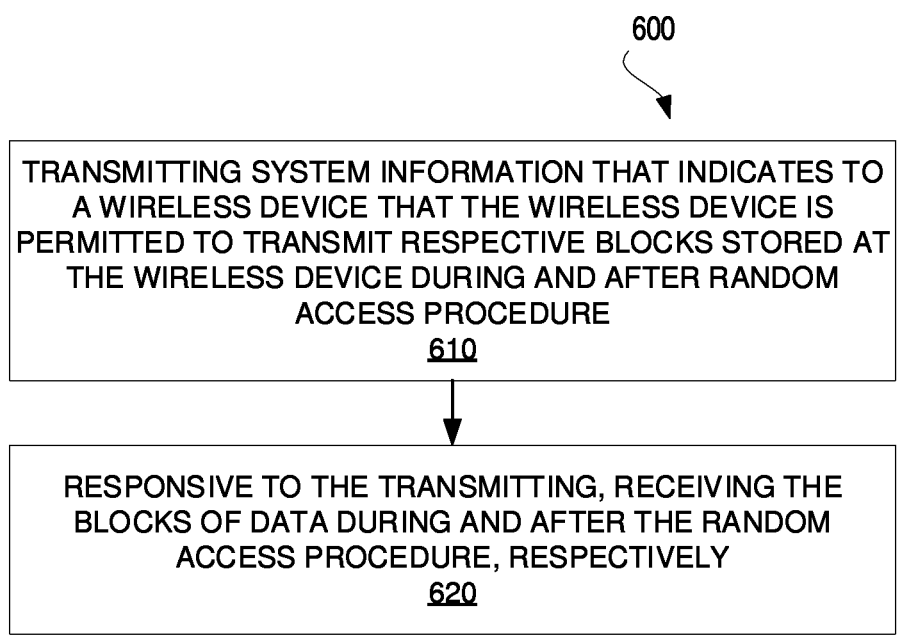
FIG. 6 is a flow diagram illustrating an example method implemented by a base station, according to one or more embodiments of the present disclosure.

FIG. 6 depicts a method 600 in accordance with other particular embodiments. The method 600 is performed by a base station 110 and includes transmitting system information that indicates to a wireless device 120 that the wireless device 120 is permitted to transmit respective blocks stored at the wireless device 120 during and after random access procedure 200 (block 610). The method 600 further includes, responsive to the transmitting, receiving the blocks of data during and after the random access procedure 200, respectively (block 620).

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 7:
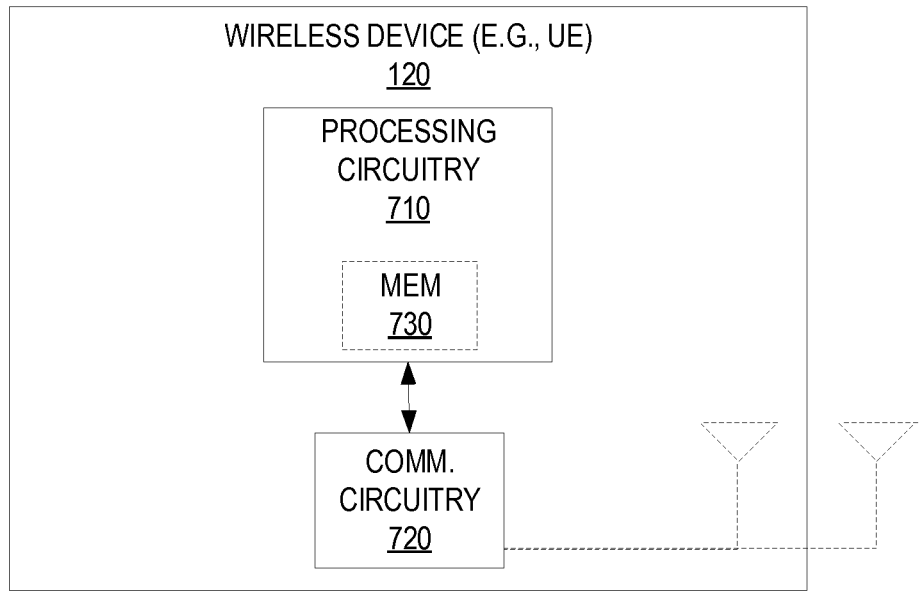
FIGS. 7 and 8 are schematic block diagrams illustrating respective examples of wireless devices (e.g., a user equipment), according to one or more embodiments of the present disclosure.

FIG. 7 for example illustrates a wireless device 120 as implemented in accordance with one or more embodiments. As shown, the wireless device 120 includes processing circuitry 710 and communication circuitry 720. The communication circuitry (e.g., radio circuitry) 720 is configured to transmit and/or receive information to and/or from one or more other nodes, e.g., via any communication technology. Such communication may occur via one or more antennas that are either internal or external to the wireless device 120. The processing circuitry 710 is configured to perform processing described above, such as by executing instructions stored in memory 730. The processing circuitry 710 in this regard may implement certain functional means, units, or modules.

Figure 8:
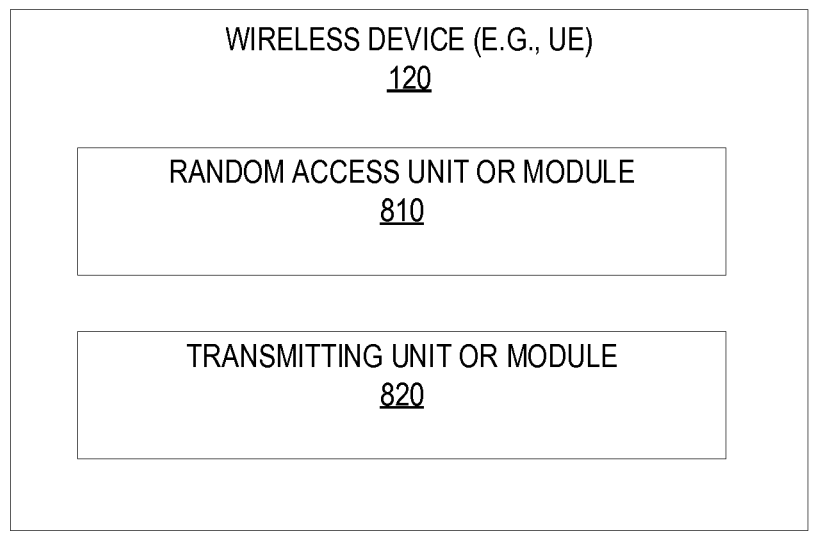
Figure 11:
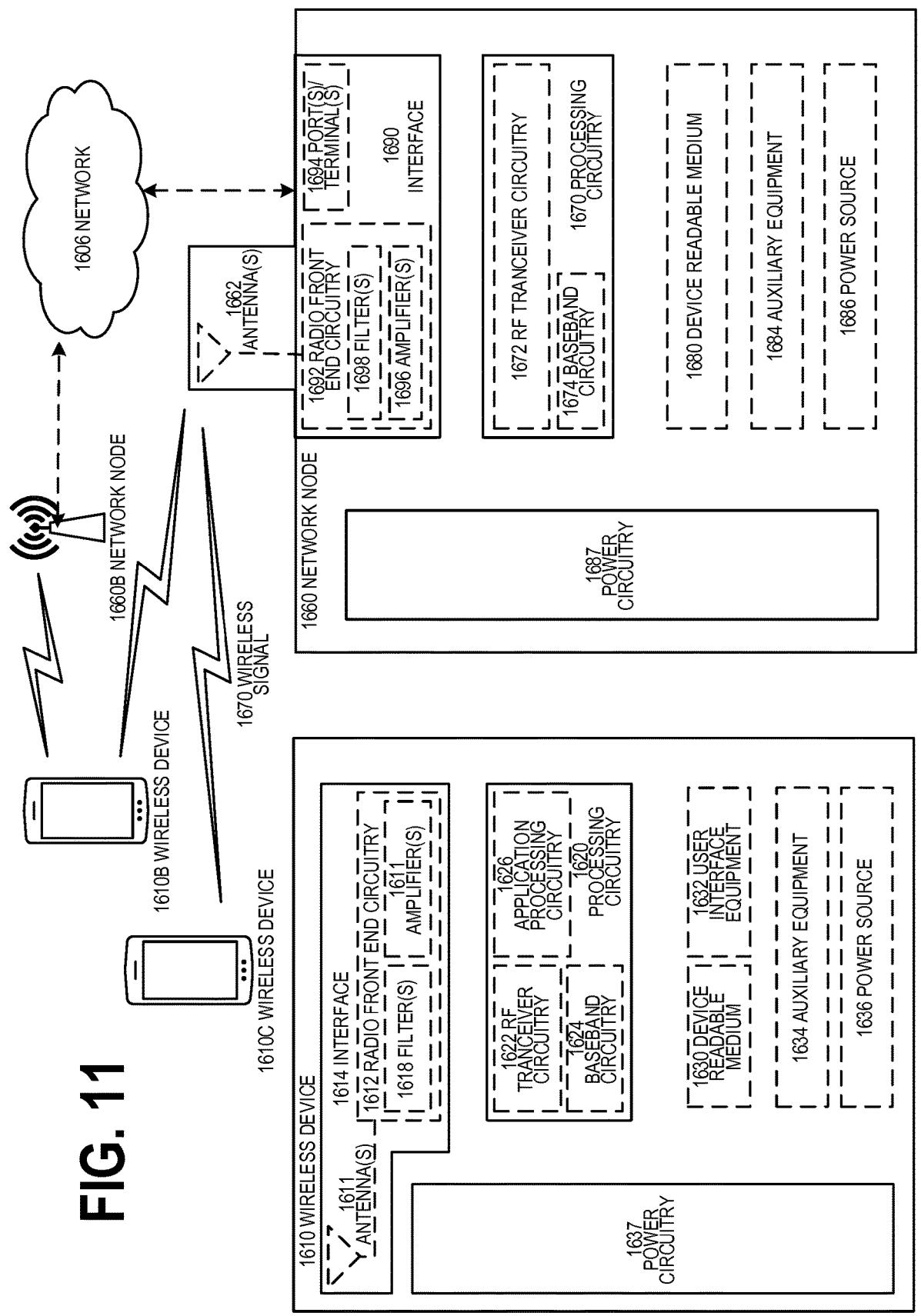
FIG. 11 is a schematic block diagram illustrating an example wireless network, according to one or more embodiments of the present disclosure.

FIG. 8 illustrates a schematic block diagram of a wireless device 120 in a wireless network according to still other embodiments (for example, the wireless network shown in FIG. 11). As shown, the wireless device 120 implements various functional means, units, or modules, e.g., via the processing circuitry 710 in FIG. 7 and/or via software code. These functional means, units, or modules, e.g., for implementing the method(s) herein, include for instance: random access unit or module 810, and transmitting unit or module 820. Random access unit or module 810 is configured to perform a random access procedure to a base station. Transmitting unit or module 820 is configured to transmit a first block of data stored at the wireless device to the base station during the random access procedure while withholding a second block of data stored at the wireless device from transmission to the base station until after completion of the random access procedure.

Figure 9:
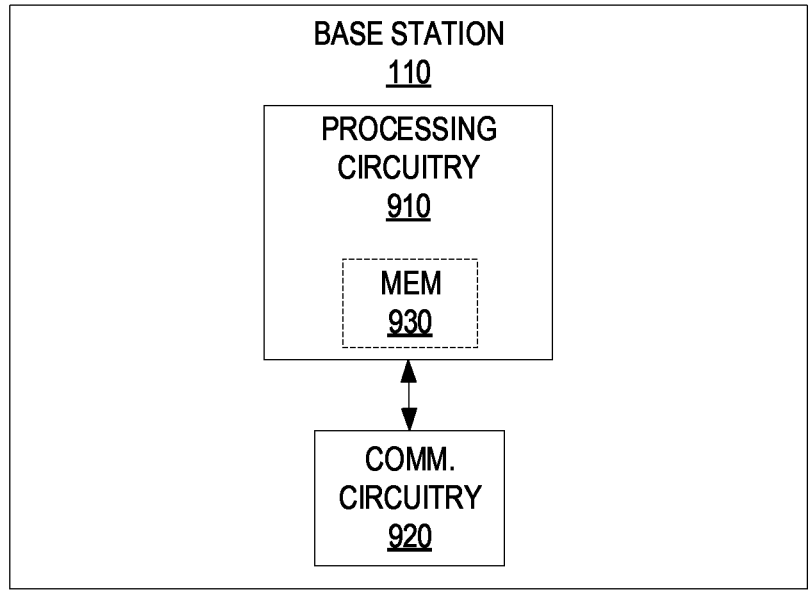
FIGS. 9 and 10 are schematic block diagrams illustrating respective examples of base stations, according to one or more embodiments of the present disclosure.

FIG. 9 illustrates a base station 110 as implemented in accordance with one or more embodiments. As shown, the base station 110 includes processing circuitry 910 and communication circuitry 920. The communication circuitry 920 is configured to transmit and/or receive information to and/or from one or more other nodes, e.g., via any communication technology. The processing circuitry 910 is configured to perform processing described above, such as by executing instructions stored in memory 930. The processing circuitry 910 in this regard may implement certain functional means, units, or modules.

Figure 10:
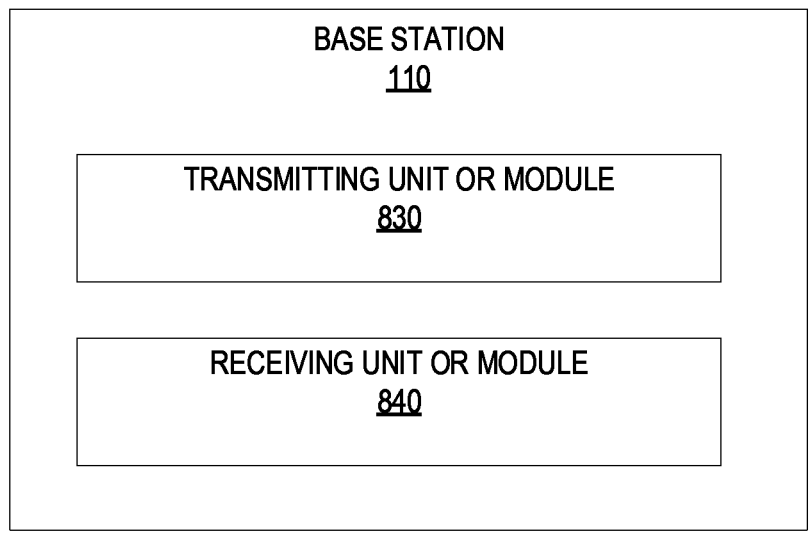

FIG. 10 illustrates a schematic block diagram of a base station 110 in a wireless network according to still other embodiments (for example, the wireless network shown in FIG. 11). As shown, the base station 110 implements various functional means, units, or modules, e.g., via the processing circuitry 910 in FIG. 9 and/or via software code. These functional means, units, or modules, e.g., for implementing the method(s) herein, include for instance: transmitting unit or module 830, and receiving unit or module 840. The transmitting unit or module 830 is configured to transmit system information that indicates to a wireless device that the wireless device is permitted to transmit respective blocks stored at the wireless device during and after random access procedure. The receiving unit or module 840 is configured to responsive to the transmitting, receive the blocks of data during and after the random access procedure, respectively.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

The indication of whether UEs in the cell are allowed to use EDT (i.e., allowed to select EDT (N)PRACH preambles for transmission of UL data in Msg3) could, in one or more embodiments, be included in the PRACH configuration in System Information as part of SIB2. FIGS. 20A and 20B illustrate an example of PRACH-Config information elements, expressed in ASN.1, in accordance with particular LTE-M embodiments. In the example below, the Information Element (IE) PRACH-ConfigSIB and the IE PRACH-Config are used to specify the PRACH configuration in the system information and in the mobility control information, respectively. Notably, subsequentDataFlag is a Boolean value that may be included, and interpreted according to the ASN.1 started in FIG. 20A and completed in FIG. 20B.

According to embodiments, if a flag (e.g., subsequentDataFlag shown above) is set, UEs are allowed to select EDT preambles for Msg1 transmission and accordingly use EDT for transmitting data in Msg3, even though all the data in the UL buffer will not fit the maximum Transport Block Size (TBS) given for EDT Msg3, and continue to the RRC_Connected state after Msg4 to transmit the remaining part of the data. If the flag is not set, on the other hand, the network has protection against improper use of EDT, and UEs may not be permitted to continue to the RRC_Connected state after Msg4. Correspondingly, a sensible eNB implementation may set the flag and allow the above behavior when the load on the EDT resources (i.e., EDT Msg1 preambles) is low, and when the load becomes higher (i.e., thereby increasing possible and/or actual data collisions, e.g. larger than a specified threshold), the eNB may, e.g., either increase the number of EDT resources (i.e. EDT Msg1 preambles to make the EDT partition larger) or change the flag to not be set in order to lower the load on the EDT resources.

Note that in the ASN.1 example of FIGS. 20A and 20B, the allowance flag for LTE-M could be set per Coverage Enhancement level (CE-level). That is, 'subsequent EDT data transmission' could be allowed for CE-levels 0, 1, and 2, but not for CE-level 3, for example.

In an alternative embodiment, the 'subsequent EDT data transmission' allowance flag may instead be included in RACH-ConfigCommon. A corresponding ASN.1 example of NPRACH-ConfigSIB-NB information elements for an embodiment in NB-IoT is given in FIGS. 21A and 21B.

Note that in this example the 'subsequent EDT data transmission' allowance flag is set for all CE-levels, but the location of this new Information Element (IE) may, according to other embodiments, be different such that this value is configurable per CE-level. Moreover, names other than subsequentDataFlag may be used.

In some embodiments, before Msg3 transmission, if an EDT capable wireless device 120 has more data arrive after initiating EDT procedure with a EDT preamble in Msg1 and a EDT UL grant is received in Msg2, the wireless device 120 continues the EDT procedure rather than starting over again with a new random access attempt or transmitting a legacy Msg3 using the EDT UL grant. This may ensure the provided UL grant in Msg2 is used and user data (although not all data in buffer) is transmitted early in Msg3 instead of being buffered until next access attempt(s).

In some embodiments, if the wireless device 120 has more data to send after EDT Msg3, i.e., with user data, the wireless device 120 indicates to the network in Msg3, e.g., using BSR MAC CE, to indicate the amount of remaining data in buffer or using an indication bit in system information as described earlier. The eNB, in response to receiving an EDT Msg3 with user data and with such an indication, indicates to the wireless device 120 to enter RRC_CONNECTED mode by transmitting a Msg4 that directs the wireless device 120 to continue the connection establishment/resumption, (i.e., using an appropriate RRC message, such as RRCConnectionSetup/RRCConnectionResume) for further uplink data transmission(s). Although the EDT wireless device 120 will not enter RRC_IDLE mode right after Msg4, the wireless device 120 will generally only need to transmit a small amount of data (e.g., the remaining data in the UL buffer) in subsequent transmissions. Accordingly, the eNB does not put the EDT wireless device 120 into Idle mode after Msg4 while more uplink data is still pending.

In some embodiments, the 'subsequent EDT data transmission' allowance parameter (e.g., the flag discussed above) is configured, either via NAS signaling, RRC signaling, or MAC control. The configuration may be done with common signaling (e.g., system information or random access response) or dedicated signaling (e.g., configuration of specific UE(s) with dedicated RRC signaling/SRB/dedicated control channel (DCCH)). The wireless device 120 may then be configured, e.g. by dedicated RRC signaling or other configuration means, and may act according to this allowance in the cell where it is given, either until further notice or according to a specified timer, for example.

In some embodiments, the wireless device 120 resumes normal operation upon entering RRC_CONNECTED state (e.g., when in RRC_CONNECTED state normal buffer status reporting resumes/applies).

In some embodiments the 'subsequent EDT data transmission' allowance restriction, if configured, does not apply when the wireless device 120 is in the RRC_CONNECTED state. In other embodiments the 'subsequent EDT data transmission' allowance restriction, if configured, remains active and does apply when the wireless device 120 is in the RRC_CONNECTED state until the configuration/allowance/restriction is released or temporarily disabled/deactivated.

Release and/or temporary disabling/deactivation of the allowance configuration/restriction may, e.g., be based on a rule/set of rules comprising meeting one or more conditions, or based on release by signalling.

If temporarily disabled, the 'subsequent EDT data transmission' allowance restriction may be (re-) enabled/-activated with signaling or based on some condition, e.g., upon wireless device 120 entering IDLE, INACTIVE or SUSPENDED state, or upon trigger to initiate EDT.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 1606, network nodes 1660 and 1660*b*, and WDs 1610, 1610*b*, and 1610*c*. In practice, a wireless network may further include any additional elements suitable to support communication between wireless devices or between a wireless device and another communication device, such as a landline telephone, a service provider, or any other network node or end device. Of the illustrated components, network node 1660 and wireless device (WD) 1610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1660 and WD 1610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and New Radio (NR) NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., Evolved-Serving Mobile Location Centres (E-SMLCs)), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 1660 includes processing circuitry 1670, device readable medium 1680, interface 1690, auxiliary equipment 1684, power source 1686, power circuitry 1687, and antenna 1662. Although network node 1660 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1660 are depicted as single boxes located within a larger box, or nested within multiple boxes, in practice, a network node may comprise multiple different physical components that make up a single illustrated component (e.g., device readable medium 1680 may comprise multiple separate hard drives as well as multiple RAM modules).

Similarly, network node 1660 may be composed of multiple physically separate components (e.g., a NodeB component and a RNC component, or a BTS component and a BSC component, etc.), which may each have their own respective components. In certain scenarios in which network node 1660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1660 may be configured to support multiple radio access technologies (RATs). In such embodiments, some components may be duplicated (e.g., separate device readable medium 1680 for the different RATs) and some components may be reused (e.g., the same antenna 1662 may be shared by the RATs). Network node 1660 may also include multiple sets of the various illustrated components for different wireless technologies integrated into network node 1660, such as, for example, Global System for Mobile communication (GSM), Wide Code Division Multiplexing Access (WCDMA), LTE, NR, WiFi, or Bluetooth wireless technologies. These wireless technologies may be integrated into the same or different chip or set of chips and other components within network node 1660.

Processing circuitry 1670 is configured to perform any determining, calculating, or similar operations (e.g., certain obtaining operations) described herein as being provided by a network node. These operations performed by processing circuitry 1670 may include processing information obtained by processing circuitry 1670 by, for example, converting the obtained information into other information, comparing the obtained information or converted information to information stored in the network node, and/or performing one or more operations based on the obtained information or converted information, and as a result of said processing making a determination.

Processing circuitry 1670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1660 components, such as device readable medium 1680, network node 1660 functionality. For example, processing circuitry 1670 may execute instructions stored in device readable medium 1680 or in memory within processing circuitry 1670. Such functionality may include providing any of the various wireless features, functions, or benefits discussed herein. In some embodiments, processing circuitry 1670 may include a system on a chip (SOC).

In some embodiments, processing circuitry 1670 may include one or more of radio frequency (RF) transceiver circuitry 1672 and baseband processing circuitry 1674. In some embodiments, radio frequency (RF) transceiver circuitry 1672 and baseband processing circuitry 1674 may be on separate chips (or sets of chips), boards, or units, such as radio units and digital units. In alternative embodiments, part or all of RF transceiver circuitry 1672 and baseband processing circuitry 1674 may be on the same chip or set of chips, boards, or units In certain embodiments, some or all of the functionality described herein as being provided by a network node, base station, eNB or other such network device may be performed by processing circuitry 1670 executing instructions stored on device readable medium 1680 or memory within processing circuitry 1670. In alternative embodiments, some or all of the functionality may be provided by processing circuitry 1670 without executing instructions stored on a separate or discrete device readable medium, such as in a hard-wired manner. In any of those embodiments, whether executing instructions stored on a device readable storage medium or not, processing circuitry 1670 can be configured to perform the described functionality. The benefits provided by such functionality are not limited to processing circuitry 1670 alone or to other components of network node 1660, but are enjoyed by network node 1660 as a whole, and/or by end users and the wireless network generally.

Device readable medium 1680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1670. Device readable medium 1680 may store any suitable instructions, data or information, including a computer program, software, an application including one or more of logic, rules, code, tables, etc. and/or other instructions capable of being executed by processing circuitry 1670 and, utilized by network node 1660. Device readable medium 1680 may be used to store any calculations made by processing circuitry 1670 and/or any data received via interface 1690. In some embodiments, processing circuitry 1670 and device readable medium 1680 may be considered to be integrated.

Interface 1690 is used in the wired or wireless communication of signalling and/or data between network node 1660, network 1606, and/or WDs 1610. As illustrated, interface 1690 comprises port(s)/terminal(s) 1694 to send and receive data, for example to and from network 1606 over a wired connection. Interface 1690 also includes radio front end circuitry 1692 that may be coupled to, or in certain embodiments a part of, antenna 1662. Radio front end circuitry 1692 comprises filters 1698 and amplifiers 1696. Radio front end circuitry 1692 may be connected to antenna 1662 and processing circuitry 1670. Radio front end circuitry may be configured to condition signals communicated between antenna 1662 and processing circuitry 1670. Radio front end circuitry 1692 may receive digital data that is to be sent out to other network nodes or WDs via a wireless connection. Radio front end circuitry 1692 may convert the digital data into a radio signal having the appropriate channel and bandwidth parameters using a combination of filters 1698 and/or amplifiers 1696. The radio signal may then be transmitted via antenna 1662. Similarly, when receiving data, antenna 1662 may collect radio signals which are then converted into digital data by radio front end circuitry 1692. The digital data may be passed to processing circuitry 1670. In other embodiments, the interface may comprise different components and/or different combinations of components.

In certain alternative embodiments, network node 1660 may not include separate radio front end circuitry 1692, instead, processing circuitry 1670 may comprise radio front end circuitry and may be connected to antenna 1662 without separate radio front end circuitry 1692. Similarly, in some embodiments, all or some of RF transceiver circuitry 1672 may be considered a part of interface 1690. In still other embodiments, interface 1690 may include one or more ports or terminals 1694, radio front end circuitry 1692, and RF transceiver circuitry 1672, as part of a radio unit (not shown), and interface 1690 may communicate with baseband processing circuitry 1674, which is part of a digital unit (not shown).

Antenna 1662 may include one or more antennas, or antenna arrays, configured to send and/or receive wireless signals. Antenna 1662 may be coupled to radio front end circuitry 1690 and may be any type of antenna capable of transmitting and receiving data and/or signals wirelessly. In some embodiments, antenna 1662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1662 may be separate from network node 1660 and may be connectable to network node 1660 through an interface or port.

Antenna 1662, interface 1690, and/or processing circuitry 1670 may be configured to perform any receiving operations and/or certain obtaining operations described herein as being performed by a network node. Any information, data and/or signals may be received from a wireless device, another network node and/or any other network equipment. Similarly, antenna 1662, interface 1690, and/or processing circuitry 1670 may be configured to perform any transmitting operations described herein as being performed by a network node. Any information, data and/or signals may be transmitted to a wireless device, another network node and/or any other network equipment.

Power circuitry 1687 may comprise, or be coupled to, power management circuitry and is configured to supply the components of network node 1660 with power for performing the functionality described herein. Power circuitry 1687 may receive power from power source 1686. Power source 1686 and/or power circuitry 1687 may be configured to provide power to the various components of network node 1660 in a form suitable for the respective components (e.g., at a voltage and current level needed for each respective component). Power source 1686 may either be included in, or external to, power circuitry 1687 and/or network node 1660. For example, network node 1660 may be connectable to an external power source (e.g., an electricity outlet) via an input circuitry or interface such as an electrical cable, whereby the external power source supplies power to power circuitry 1687. As a further example, power source 1686 may comprise a source of power in the form of a battery or battery pack which is connected to, or integrated in, power circuitry 1687. The battery may provide backup power should the external power source fail. Other types of power sources, such as photovoltaic devices, may also be used.

Alternative embodiments of network node 1660 may include additional components beyond those shown in FIG. 11 that may be responsible for providing certain aspects of the network node's functionality, including any of the functionality described herein and/or any functionality necessary to support the subject matter described herein. For example, network node 1660 may include user interface equipment to allow input of information into network node 1660 and to allow output of information from network node 1660. This may allow a user to perform diagnostic, maintenance, repair, and other administrative functions for network node 1660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1610 includes antenna 1611, interface 1614, processing circuitry 1620, device readable medium 1630, user interface equipment 1632, auxiliary equipment 1634, power source 1636 and power circuitry 1637. WD 1610 may include multiple sets of one or more of the illustrated components for different wireless technologies supported by WD 1610, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1610.

Antenna 1611 may include one or more antennas or antenna arrays, configured to send and/or receive wireless signals, and is connected to interface 1614. In certain alternative embodiments, antenna 1611 may be separate from WD 1610 and be connectable to WD 1610 through an interface or port. Antenna 1611, interface 1614, and/or processing circuitry 1620 may be configured to perform any receiving or transmitting operations described herein as being performed by a WD. Any information, data and/or signals may be received from a network node and/or another WD. In some embodiments, radio front end circuitry and/or antenna 1611 may be considered an interface.

As illustrated, interface 1614 comprises radio front end circuitry 1612 and antenna 1611. Radio front end circuitry 1612 comprise one or more filters 1618 and amplifiers 1616. Radio front end circuitry 1614 is connected to antenna 1611 and processing circuitry 1620, and is configured to condition signals communicated between antenna 1611 and processing circuitry 1620. Radio front end circuitry 1612 may be coupled to or a part of antenna 1611. In some embodiments, WD 1610 may not include separate radio front end circuitry 1612; rather, processing circuitry 1620 may comprise radio front end circuitry and may be connected to antenna 1611. Similarly, in some embodiments, some or all of RF transceiver circuitry 1622 may be considered a part of interface 1614. Radio front end circuitry 1612 may receive digital data that is to be sent out to other network nodes or WDs via a wireless connection. Radio front end circuitry 1612 may convert the digital data into a radio signal having the appropriate channel and bandwidth parameters using a combination of filters 1618 and/or amplifiers 1616. The radio signal may then be transmitted via antenna 1611. Similarly, when receiving data, antenna 1611 may collect radio signals which are then converted into digital data by radio front end circuitry 1612. The digital data may be passed to processing circuitry 1620. In other embodiments, the interface may comprise different components and/or different combinations of components.

Processing circuitry 1620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1610 components, such as device readable medium 1630, WD 1610 functionality. Such functionality may include providing any of the various wireless features or benefits discussed herein. For example, processing circuitry 1620 may execute instructions stored in device readable medium 1630 or in memory within processing circuitry 1620 to provide the functionality disclosed herein.

As illustrated, processing circuitry 1620 includes one or more of RF transceiver circuitry 1622, baseband processing circuitry 1624, and application processing circuitry 1626. In other embodiments, the processing circuitry may comprise different components and/or different combinations of components. In certain embodiments processing circuitry 1620 of WD 1610 may comprise a SOC. In some embodiments, RF transceiver circuitry 1622, baseband processing circuitry 1624, and application processing circuitry 1626 may be on separate chips or sets of chips. In alternative embodiments, part or all of baseband processing circuitry 1624 and application processing circuitry 1626 may be combined into one chip or set of chips, and RF transceiver circuitry 1622 may be on a separate chip or set of chips. In still alternative embodiments, part or all of RF transceiver circuitry 1622 and baseband processing circuitry 1624 may be on the same chip or set of chips, and application processing circuitry 1626 may be on a separate chip or set of chips. In yet other alternative embodiments, part or all of RF transceiver circuitry 1622, baseband processing circuitry 1624, and application processing circuitry 1626 may be combined in the same chip or set of chips. In some embodiments, RF transceiver circuitry 1622 may be a part of interface 1614. RF transceiver circuitry 1622 may condition RF signals for processing circuitry 1620.

In certain embodiments, some or all of the functionality described herein as being performed by a WD may be provided by processing circuitry 1620 executing instructions stored on device readable medium 1630, which in certain embodiments may be a computer-readable storage medium. In alternative embodiments, some or all of the functionality may be provided by processing circuitry 1620 without executing instructions stored on a separate or discrete device readable storage medium, such as in a hard-wired manner. In any of those particular embodiments, whether executing instructions stored on a device readable storage medium or not, processing circuitry 1620 can be configured to perform the described functionality. The benefits provided by such functionality are not limited to processing circuitry 1620 alone or to other components of WD 1610, but are enjoyed by WD 1610 as a whole, and/or by end users and the wireless network generally.

Processing circuitry 1620 may be configured to perform any determining, calculating, or similar operations (e.g., certain obtaining operations) described herein as being performed by a WD. These operations, as performed by processing circuitry 1620, may include processing information obtained by processing circuitry 1620 by, for example, converting the obtained information into other information, comparing the obtained information or converted information to information stored by WD 1610, and/or performing one or more operations based on the obtained information or converted information, and as a result of said processing making a determination.

Device readable medium 1630 may be operable to store a computer program, software, an application including one or more of logic, rules, code, tables, etc. and/or other instructions capable of being executed by processing circuitry 1620. Device readable medium 1630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1620. In some embodiments, processing circuitry 1620 and device readable medium 1630 may be considered to be integrated.

User interface equipment 1632 may provide components that allow for a human user to interact with WD 1610. Such interaction may be of many forms, such as visual, audial, tactile, etc. User interface equipment 1632 may be operable to produce output to the user and to allow the user to provide input to WD 1610. The type of interaction may vary depending on the type of user interface equipment 1632 installed in WD 1610. For example, if WD 1610 is a smart phone, the interaction may be via a touch screen; if WD 1610 is a smart meter, the interaction may be through a screen that provides usage (e.g., the number of gallons used) or a speaker that provides an audible alert (e.g., if smoke is detected). User interface equipment 1632 may include input interfaces, devices and circuits, and output interfaces, devices and circuits. User interface equipment 1632 is configured to allow input of information into WD 1610, and is connected to processing circuitry 1620 to allow processing circuitry 1620 to process the input information. User interface equipment 1632 may include, for example, a microphone, a proximity or other sensor, keys/buttons, a touch display, one or more cameras, a USB port, or other input circuitry. User interface equipment 1632 is also configured to allow output of information from WD 1610, and to allow processing circuitry 1620 to output information from WD 1610. User interface equipment 1632 may include, for example, a speaker, a display, vibrating circuitry, a USB port, a headphone interface, or other output circuitry. Using one or more input and output interfaces, devices, and circuits, of user interface equipment 1632, WD 1610 may communicate with end users and/or the wireless network, and allow them to benefit from the functionality described herein.

Auxiliary equipment 1634 is operable to provide more specific functionality which may not be generally performed by WDs. This may comprise specialized sensors for doing measurements for various purposes, interfaces for additional types of communication such as wired communications etc. The inclusion and type of components of auxiliary equipment 1634 may vary depending on the embodiment and/or scenario.

Power source 1636 may, in some embodiments, be in the form of a battery or battery pack. Other types of power sources, such as an external power source (e.g., an electricity outlet), photovoltaic devices or power cells, may also be used. WD 1610 may further comprise power circuitry 1637 for delivering power from power source 1636 to the various parts of WD 1610 which need power from power source 1636 to carry out any functionality described or indicated herein. Power circuitry 1637 may in certain embodiments comprise power management circuitry. Power circuitry 1637 may additionally or alternatively be operable to receive power from an external power source; in which case WD 1610 may be connectable to the external power source (such as an electricity outlet) via input circuitry or an interface such as an electrical power cable. Power circuitry 1637 may also in certain embodiments be operable to deliver power from an external power source to power source 1636. This may be, for example, for the charging of power source 1636. Power circuitry 1637 may perform any formatting, converting, or other modification to the power from power source 1636 to make the power suitable for the respective components of WD 1610 to which power is supplied.

Figure 12:
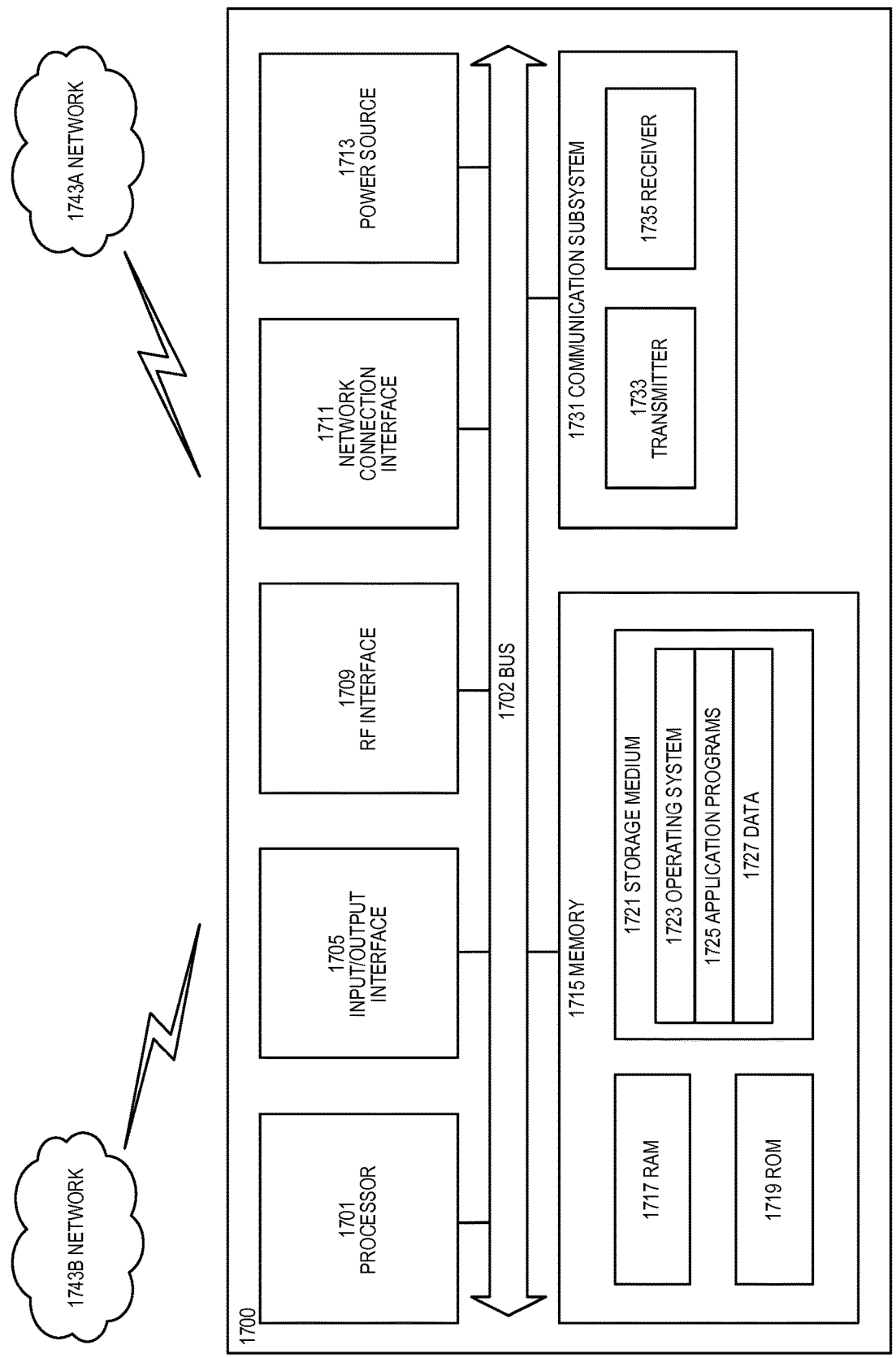
FIG. 12 is a schematic block diagram illustrating an example user equipment (UE), according to one or more embodiments of the present disclosure.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1700 may be any UE identified by the $3^{rd}$ Generation Partnership Project (3GPP), including a NB-IoT UE, a machine type communication (MTC) UE, and/or an enhanced MTC (eMTC) UE. UE 1700, as illustrated in FIG. 12, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 1700 includes processing circuitry 1701 that is operatively coupled to input/output interface 1705, radio frequency (RF) interface 1709, network connection interface 1711, memory 1715 including random access memory (RAM) 1717, read-only memory (ROM) 1719, and storage medium 1721 or the like, communication subsystem 1731, power source 1733, and/or any other component, or any combination thereof. Storage medium 1721 includes operating system 1723, application program 1725, and data 1727. In other embodiments, storage medium 1721 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 1701 may be configured to process computer instructions and data. Processing circuitry 1701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1701 may include two central processing units (CPUs). Data may be information in a form suitable for use by a computer.

In the depicted embodiment, input/output interface 1705 may be configured to provide a communication interface to an input device, output device, or input and output device. UE 1700 may be configured to use an output device via input/output interface 1705. An output device may use the same type of interface port as an input device. For example, a USB port may be used to provide input to and output from UE 1700. The output device may be a speaker, a sound card, a video card, a display, a monitor, a printer, an actuator, an emitter, a smartcard, another output device, or any combination thereof. UE 1700 may be configured to use an input device via input/output interface 1705 to allow a user to capture information into UE 1700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 1709 may be configured to provide a communication interface to RF components such as a transmitter, a receiver, and an antenna. Network connection interface 1711 may be configured to provide a communication interface to network 1743a. Network 1743a may encompass wired and/or wireless networks such as a local-area network (LAN), a wide-area network (WAN), a computer network, a wireless network, a telecommunications network, another like network or any combination thereof. For example, network 1743a may comprise a Wi-Fi network. Network connection interface 1711 may be configured to include a receiver and a transmitter interface used to communicate with one or more other devices over a communication network according to one or more communication protocols, such as Ethernet, TCP/IP, SONET, ATM, or the like. Network connection interface 1711 may implement receiver and transmitter functionality appropriate to the communication network links (e.g., optical, electrical, and the like). The transmitter and receiver functions may share circuit components, software or firmware, or alternatively may be implemented separately.

RAM 1717 may be configured to interface via bus 1702 to processing circuitry 1701 to provide storage or caching of data or computer instructions during the execution of software programs such as the operating system, application programs, and device drivers. ROM 1719 may be configured to provide computer instructions or data to processing circuitry 1701. For example, ROM 1719 may be configured to store invariant low-level system code or data for basic system functions such as basic input and output (I/O), startup, or reception of keystrokes from a keyboard that are stored in a non-volatile memory. Storage medium 1721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1721 may be configured to include operating system 1723, application program 1725 such as a web browser application, a widget or gadget engine or another application, and data file 1727. Storage medium 1721 may store, for use by UE 1700, any of a variety of various operating systems or combinations of operating systems.

Storage medium 1721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1721 may allow UE 1700 to access computer-executable instructions, application programs or the like, stored on transitory or non-transitory memory media, to off-load data, or to upload data. An article of manufacture, such as one utilizing a communication system may be tangibly embodied in storage medium 1721, which may comprise a device readable medium.

In FIG. 12, processing circuitry 1701 may be configured to communicate with network 1743b using communication subsystem 1731. Network 1743a and network 1743b may be the same network or networks or different network or networks. Communication subsystem 1731 may be configured to include one or more transceivers used to communicate with network 1743b. For example, communication subsystem 1731 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1733 and/or receiver 1735 to implement transmitter or receiver functionality, respectively, appropriate to the RAN links (e.g., frequency allocations and the like). Further, transmitter 1733 and receiver 1735 of each transceiver may share circuit components, software or firmware, or alternatively may be implemented separately.

In the illustrated embodiment, the communication functions of communication subsystem 1731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1731 may include cellular communication, Wi-Fi communication, Bluetooth communication, and GPS communication. Network 1743b may encompass wired and/or wireless networks such as a local-area network (LAN), a wide-area network (WAN), a computer network, a wireless network, a telecommunications network, another like network or any combination thereof. For example, network 1743b may be a cellular network, a Wi-Fi network, and/or a near-field network. Power source 1713 may be configured to provide alternating current (AC) or direct current (DC) power to components of UE 1700.

The features, benefits and/or functions described herein may be implemented in one of the components of UE 1700 or partitioned across multiple components of UE 1700. Further, the features, benefits, and/or functions described herein may be implemented in any combination of hardware, software or firmware. In one example, communication subsystem 1731 may be configured to include any of the components described herein. Further, processing circuitry 1701 may be configured to communicate with any of such components over bus 1702. In another example, any of such components may be represented by program instructions stored in memory that when executed by processing circuitry 1701 perform the corresponding functions described herein. In another example, the functionality of any of such components may be partitioned between processing circuitry 1701 and communication subsystem 1731. In another example, the non-computationally intensive functions of any of such components may be implemented in software or firmware and the computationally intensive functions may be implemented in hardware.

Figure 13:
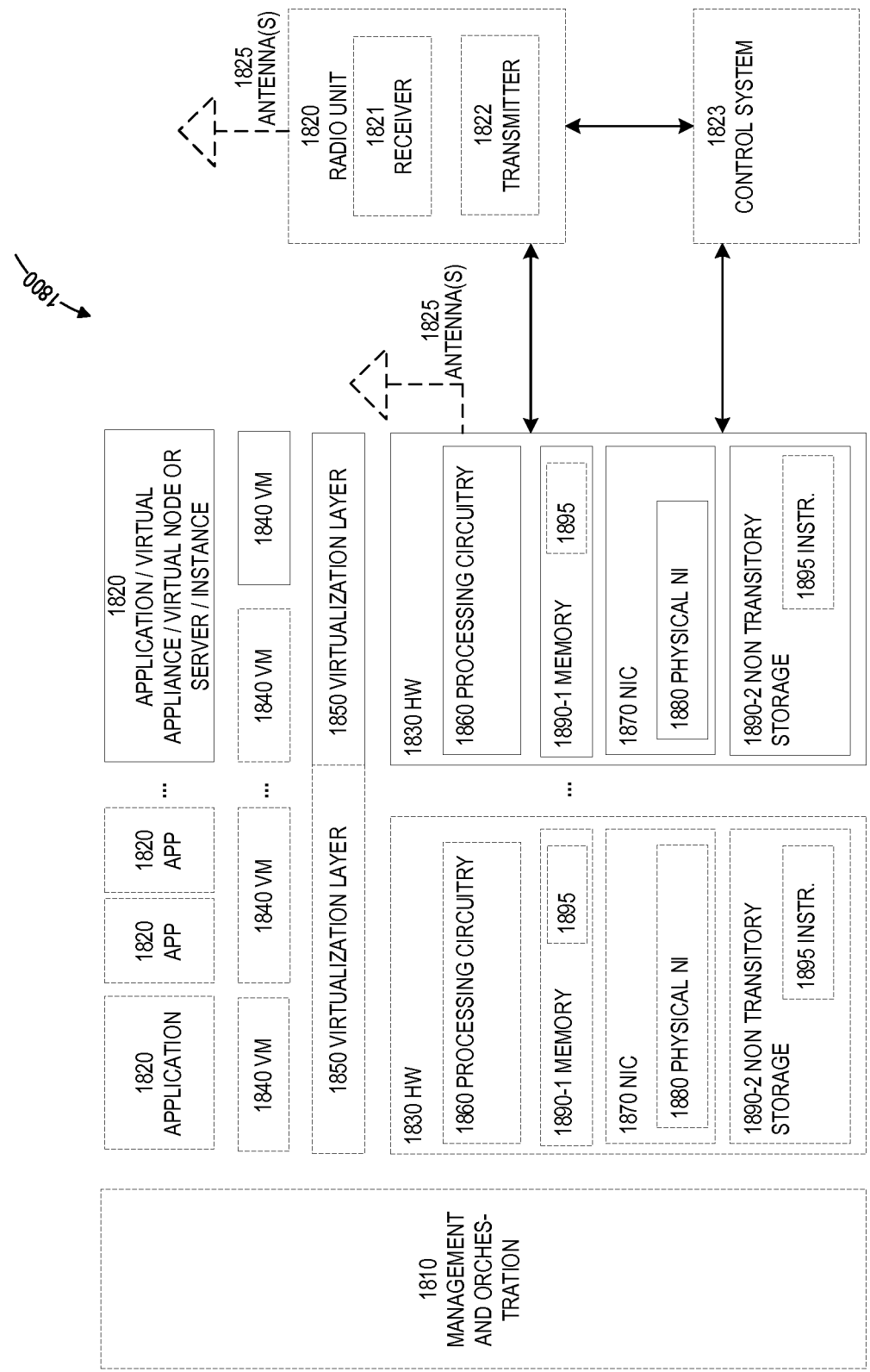
FIG. 13 is a schematic block diagram illustrating an example of a virtualization environment, according to one or more embodiments of the present disclosure.

FIG. 13 is a schematic block diagram illustrating a virtualization environment 1800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1800 hosted by one or more of hardware nodes 1830. Further, in embodiments in which the virtual node is not a radio access node or does not require radio connectivity (e.g., a core network node), then the network node may be entirely virtualized.

The functions may be implemented by one or more applications 1820 (which may alternatively be called software instances, virtual appliances, network functions, virtual nodes, virtual network functions, etc.) operative to implement some of the features, functions, and/or benefits of some of the embodiments disclosed herein. Applications 1820 are run in virtualization environment 1800 which provides hardware 1830 comprising processing circuitry 1860 and memory 1890. Memory 1890 contains instructions 1895 executable by processing circuitry 1860 whereby application 1820 is operative to provide one or more of the features, benefits, and/or functions disclosed herein.

Virtualization environment 1800, comprises general-purpose or special-purpose network hardware devices 1830 comprising a set of one or more processors or processing circuitry 1860, which may be commercial off-the-shelf (COTS) processors, dedicated Application Specific Integrated Circuits (ASICs), or any other type of processing circuitry including digital or analog hardware components or special purpose processors. Each hardware device may comprise memory 1890-1 which may be non-persistent memory for temporarily storing instructions 1895 or software executed by processing circuitry 1860. Each hardware device may comprise one or more network interface controllers (NICs) 1870, also known as network interface cards, which include physical network interface 1880. Each hardware device may also include non-transitory, persistent, machine-readable storage media 1890-2 having stored therein software 1895 and/or instructions executable by processing circuitry 1860. Software 1895 may include any type of software including software for instantiating one or more virtualization layers 1850 (also referred to as hypervisors), software to execute virtual machines 1840 as well as software allowing it to execute functions, features and/or benefits described in relation with some embodiments described herein.

Virtual machines 1840, comprise virtual processing, virtual memory, virtual networking or interface and virtual storage, and may be run by a corresponding virtualization layer 1850 or hypervisor. Different embodiments of the instance of virtual appliance 1820 may be implemented on one or more of virtual machines 1840, and the implementations may be made in different ways.

During operation, processing circuitry 1860 executes software 1895 to instantiate the hypervisor or virtualization layer 1850, which may sometimes be referred to as a virtual machine monitor (VMM). Virtualization layer 1850 may present a virtual operating platform that appears like networking hardware to virtual machine 1840.

As shown in FIG. 13, hardware 1830 may be a standalone network node with generic or specific components. Hardware 1830 may comprise antenna 18225 and may implement some functions via virtualization. Alternatively, hardware 1830 may be part of a larger cluster of hardware (e.g. such as in a data center or customer premise equipment (CPE)) where many hardware nodes work together and are managed via management and orchestration (MANO) 18100, which, among others, oversees lifecycle management of applications 1820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1840 may be a software implementation of a physical machine that runs programs as if they were executing on a physical, non-virtualized machine. Each of virtual machines 1840, and that part of hardware 1830 that executes that virtual machine, be it hardware dedicated to that virtual machine and/or hardware shared by that virtual machine with others of the virtual machines 1840, forms a separate virtual network elements (VNE).

Still in the context of NFV, Virtual Network Function (VNF) is responsible for handling specific network functions that run in one or more virtual machines 1840 on top of hardware networking infrastructure 1830 and corresponds to application 1820 in FIG. 13.

In some embodiments, one or more radio units 18200 that each include one or more transmitters 18220 and one or more receivers 18210 may be coupled to one or more antennas 18225. Radio units 18200 may communicate directly with hardware nodes 1830 via one or more appropriate network interfaces and may be used in combination with the virtual components to provide a virtual node with radio capabilities, such as a radio access node or a base station.

In some embodiments, some signalling can be effected with the use of control system 18230 which may alternatively be used for communication between the hardware nodes 1830 and radio units 18200.

Figure 14:
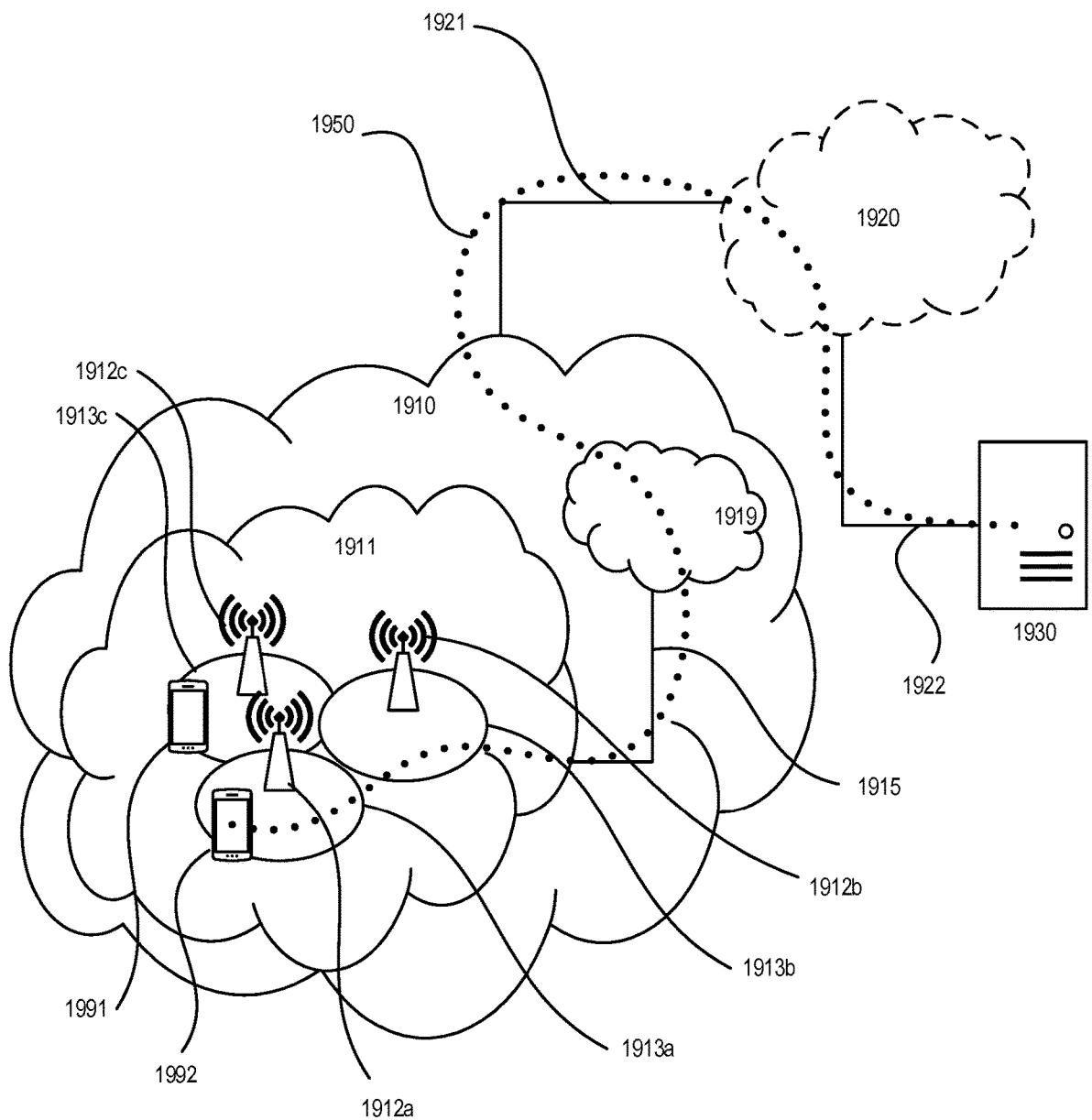
FIG. 14 is a schematic illustrating an example telecommunication network, according to one or more embodiments of the present disclosure.

FIG. 14 illustrates a telecommunication network connected via an intermediate network to a host computer in accordance with some embodiments. In particular, with reference to FIG. 14, in accordance with an embodiment, a communication system includes telecommunication network 1910, such as a 3GPP-type cellular network, which comprises access network 1911, such as a radio access network, and core network 1914. Access network 1911 comprises a plurality of base stations 1912*a*, 1912*b*, 1912*c*, such as NBs, eNBs, gNBs or other types of wireless access points, each defining a corresponding coverage area 1913*a*, 1913*b*, 1913*c*. Each base station 1912*a*, 1912*b*, 1912*c* is connectable to core network 1914 over a wired or wireless connection 1915. A first UE 1991 located in coverage area 1913*c* is configured to wirelessly connect to, or be paged by, the corresponding base station 1912*c*. A second UE 1992 in coverage area 1913*a* is wirelessly connectable to the corresponding base station 1912*a*. While a plurality of UEs 1991, 1992 are illustrated in this example, the disclosed embodiments are equally applicable to a situation where a sole UE is in the coverage area or where a sole UE is connecting to the corresponding base station 1912.

Telecommunication network 1910 is itself connected to host computer 1930, which may be embodied in the hardware and/or software of a standalone server, a cloud-implemented server, a distributed server or as processing resources in a server farm. Host computer 1930 may be under the ownership or control of a service provider, or may be operated by the service provider or on behalf of the service provider. Connections 1921 and 1922 between telecommunication network 1910 and host computer 1930 may extend directly from core network 1914 to host computer 1930 or may go via an optional intermediate network 1920. Intermediate network 1920 may be one of, or a combination of more than one of, a public, private or hosted network; intermediate network 1920, if any, may be a backbone network or the Internet; in particular, intermediate network 1920 may comprise two or more sub-networks (not shown).

The communication system of FIG. 14 as a whole enables connectivity between the connected UEs 1991, 1992 and host computer 1930. The connectivity may be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 may be transparent in the sense that the participating communication devices through which OTT connection 1950 passes are unaware of routing of uplink and downlink communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing uplink communication originating from the UE 1991 towards the host computer 1930.

Figure 15:
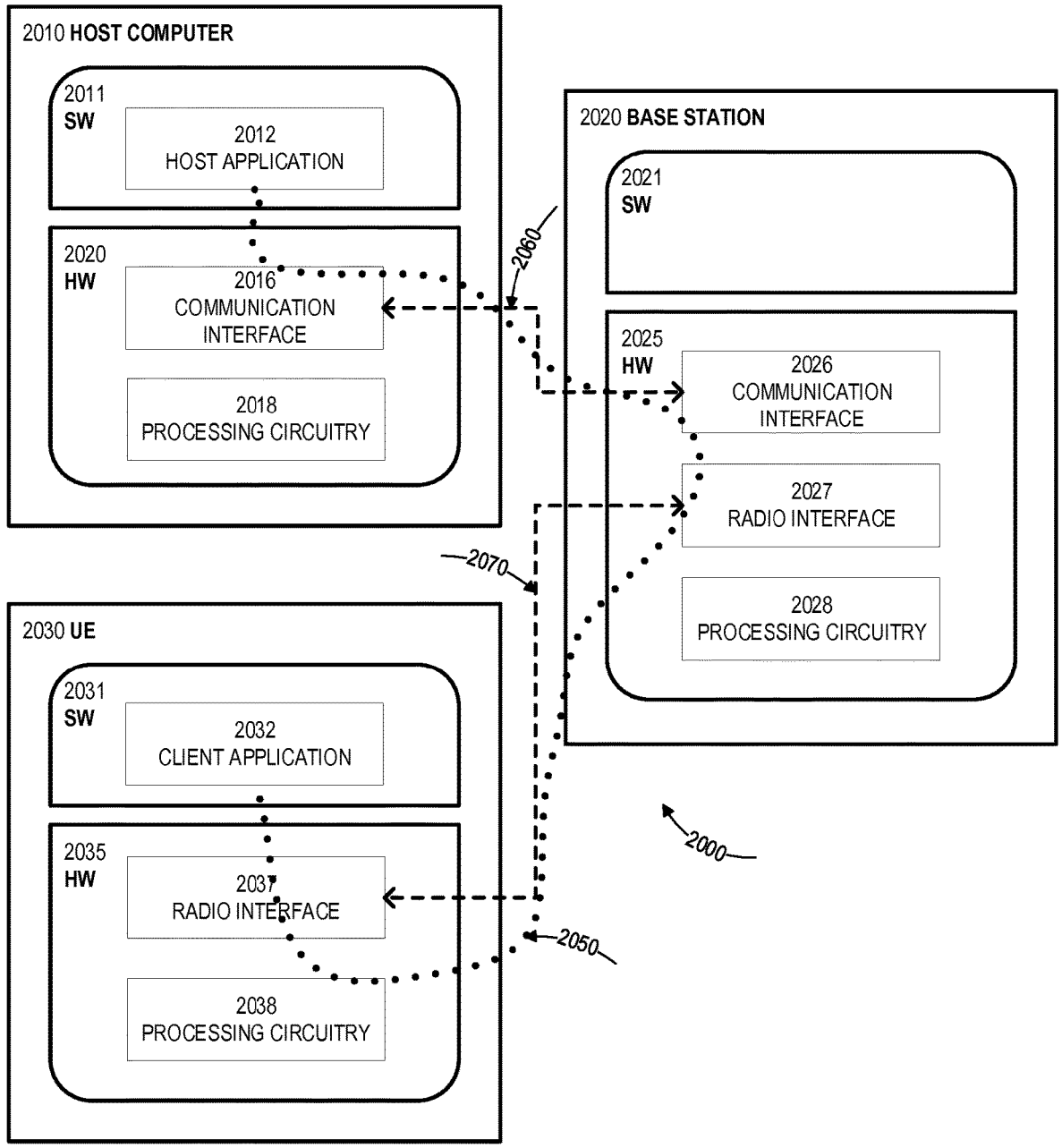
FIG. 15 is a schematic block diagram illustrating an example communication system, according to one or more embodiments of the present disclosure.

Example implementations, in accordance with an embodiment, of the UE, base station and host computer discussed in the preceding paragraphs will now be described with reference to FIG. 15. FIG. 15 illustrates host computer communicating via a base station with a user equipment over a partially wireless connection in accordance with some embodiments. In communication system 2000, host computer 2010 comprises hardware 2015 including communication interface 2016 configured to set up and maintain a wired or wireless connection with an interface of a different communication device of communication system 2000. Host computer 2010 further comprises processing circuitry 2018, which may have storage and/or processing capabilities. In particular, processing circuitry 2018 may comprise one or more programmable processors, application-specific integrated circuits, field programmable gate arrays or combinations of these (not shown) adapted to execute instructions.

Host computer 2010 further comprises software 2011, which is stored in or accessible by host computer 2010 and executable by processing circuitry 2018. Software 2011 includes host application 2012. Host application 2012 may be operable to provide a service to a remote user, such as UE 2030 connecting via OTT connection 2050 terminating at UE 2030 and host computer 2010. In providing the service to the remote user, host application 2012 may provide user data which is transmitted using OTT connection 2050.

Communication system 2000 further includes base station 2020 provided in a telecommunication system and comprising hardware 2025 enabling it to communicate with host computer 2010 and with UE 2030. Hardware 2025 may include communication interface 2026 for setting up and maintaining a wired or wireless connection with an interface of a different communication device of communication system 2000, as well as radio interface 2027 for setting up and maintaining at least wireless connection 2070 with UE 2030 located in a coverage area (not shown in FIG. 15) served by base station 2020. Communication interface 2026 may be configured to facilitate connection 2060 to host computer 2010. Connection 2060 may be direct or it may pass through a core network (not shown in FIG. 15) of the telecommunication system and/or through one or more intermediate networks outside the telecommunication system. In the embodiment shown, hardware 2025 of base station 2020 further includes processing circuitry 2028, which may comprise one or more programmable processors, application-specific integrated circuits, field programmable gate arrays or combinations of these (not shown) adapted to execute instructions. Base station 2020 further has software 2021 stored internally or accessible via an external connection.

Communication system 2000 further includes UE 2030 already referred to. Its hardware 2035 may include radio interface 2037 configured to set up and maintain wireless connection 2070 with a base station serving a coverage area in which UE 2030 is currently located. Hardware 2035 of UE 2030 further includes processing circuitry 2038, which may comprise one or more programmable processors, application-specific integrated circuits, field programmable gate arrays or combinations of these (not shown) adapted to execute instructions. UE 2030 further comprises software 2031, which is stored in or accessible by UE 2030 and executable by processing circuitry 2038. Software 2031 includes client application 2032. Client application 2032 may be operable to provide a service to a human or non-human user via UE 2030, with the support of host computer 2010. In host computer 2010, an executing host application 2012 may communicate with the executing client application 2032 via OTT connection 2050 terminating at UE 2030 and host computer 2010. In providing the service to the user, client application 2032 may receive request data from host application 2012 and provide user data in response to the request data. OTT connection 2050 may transfer both the request data and the user data. Client application 2032 may interact with the user to generate the user data that it provides.

It is noted that host computer 2010, base station 2020 and UE 2030 illustrated in FIG. 15 may be similar or identical to host computer 1930, one of base stations 1912*a*, 1912*b*, 1912*c* and one of UEs 1991, 1992 of FIG. 14, respectively. This is to say, the inner workings of these entities may be as shown in FIG. 15 and independently, the surrounding network topology may be that of FIG. 14.

In FIG. 15, OTT connection 2050 has been drawn abstractly to illustrate the communication between host computer 2010 and UE 2030 via base station 2020, without explicit reference to any intermediary devices and the precise routing of messages via these devices. Network infrastructure may determine the routing, which it may be configured to hide from UE 2030 or from the service provider operating host computer 2010, or both. While OTT connection 2050 is active, the network infrastructure may further take decisions by which it dynamically changes the routing (e.g., on the basis of load balancing consideration or reconfiguration of the network).

Wireless connection 2070 between UE 2030 and base station 2020 is in accordance with the teachings of the embodiments described throughout this disclosure. One or more of the various embodiments improve the performance of OTT services provided to UE 2030 using OTT connection 2050, in which wireless connection 2070 forms the last segment. More precisely, the teachings of these embodiments may improve UE and/or network performance, e.g., by reducing network signaling overhead when a UE has more data to transmit than is permitted during random access.

A measurement procedure may be provided for the purpose of monitoring data rate, latency and other factors on which the one or more embodiments improve. There may further be an optional network functionality for reconfiguring OTT connection 2050 between host computer 2010 and UE 2030, in response to variations in the measurement results. The measurement procedure and/or the network functionality for reconfiguring OTT connection 2050 may be implemented in software 2011 and hardware 2015 of host computer 2010 or in software 2031 and hardware 2035 of UE 2030, or both. In embodiments, sensors (not shown) may be deployed in or in association with communication devices through which OTT connection 2050 passes; the sensors may participate in the measurement procedure by supplying values of the monitored quantities exemplified above, or supplying values of other physical quantities from which software 2011, 2031 may compute or estimate the monitored quantities. The reconfiguring of OTT connection 2050 may include message format, retransmission settings, preferred routing etc.; the reconfiguring need not affect base station 2020, and it may be unknown or imperceptible to base station 2020. Such procedures and functionalities may be known and practiced in the art. In certain embodiments, measurements may involve proprietary UE signaling facilitating host computer 2010's measurements of throughput, propagation times, latency and the like. The measurements may be implemented in that software 2011 and 2031 causes messages to be transmitted, in particular empty or 'dummy' messages, using OTT connection 2050 while it monitors propagation times, errors etc.

Figure 16:
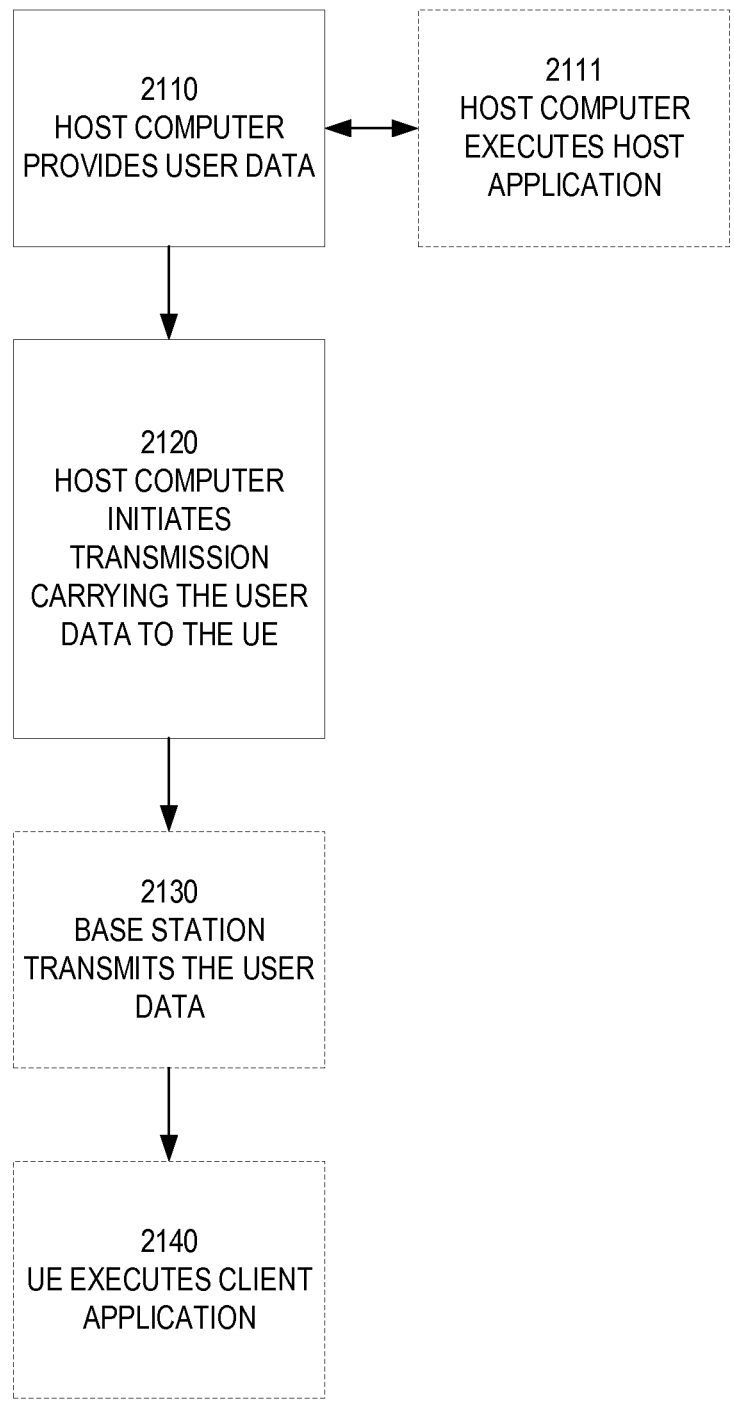
FIGS. 16-19 are flow diagrams, each of which illustrates an example method, according to particular embodiments of the present disclosure.

FIG. 16 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 16 will be included in this section. In step 2110, the host computer provides user data. In substep 2111 (which may be optional) of step 2110, the host computer provides the user data by executing a host application. In step 2120, the host computer initiates a transmission carrying the user data to the UE. In step 2130 (which may be optional), the base station transmits to the UE the user data which was carried in the transmission that the host computer initiated, in accordance with the teachings of the embodiments described throughout this disclosure. In step 2140 (which may also be optional), the UE executes a client application associated with the host application executed by the host computer.

Figure 17:
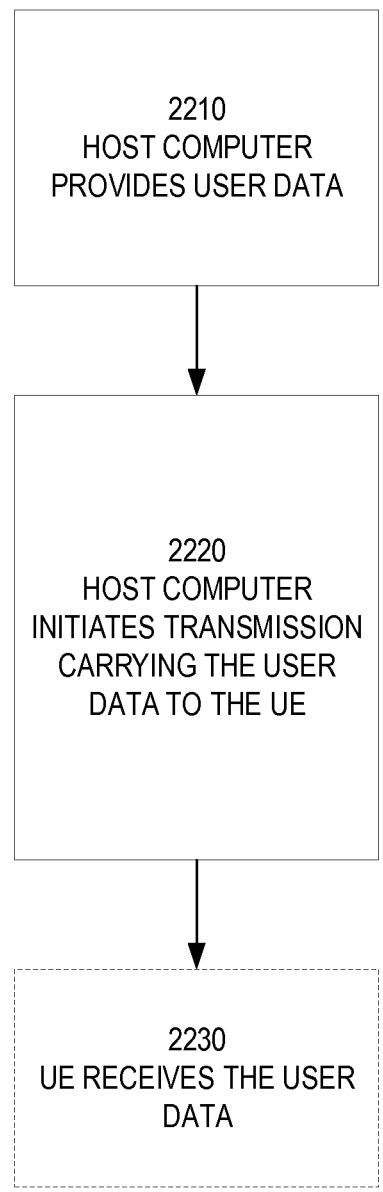

FIG. 17 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 17 will be included in this section. In step 2210 of the method, the host computer provides user data. In an optional substep (not shown) the host computer provides the user data by executing a host application. In step 2220, the host computer initiates a transmission carrying the user data to the UE. The transmission may pass via the base station, in accordance with the teachings of the embodiments described throughout this disclosure. In step 2230 (which may be optional), the UE receives the user data carried in the transmission.

Figure 18:
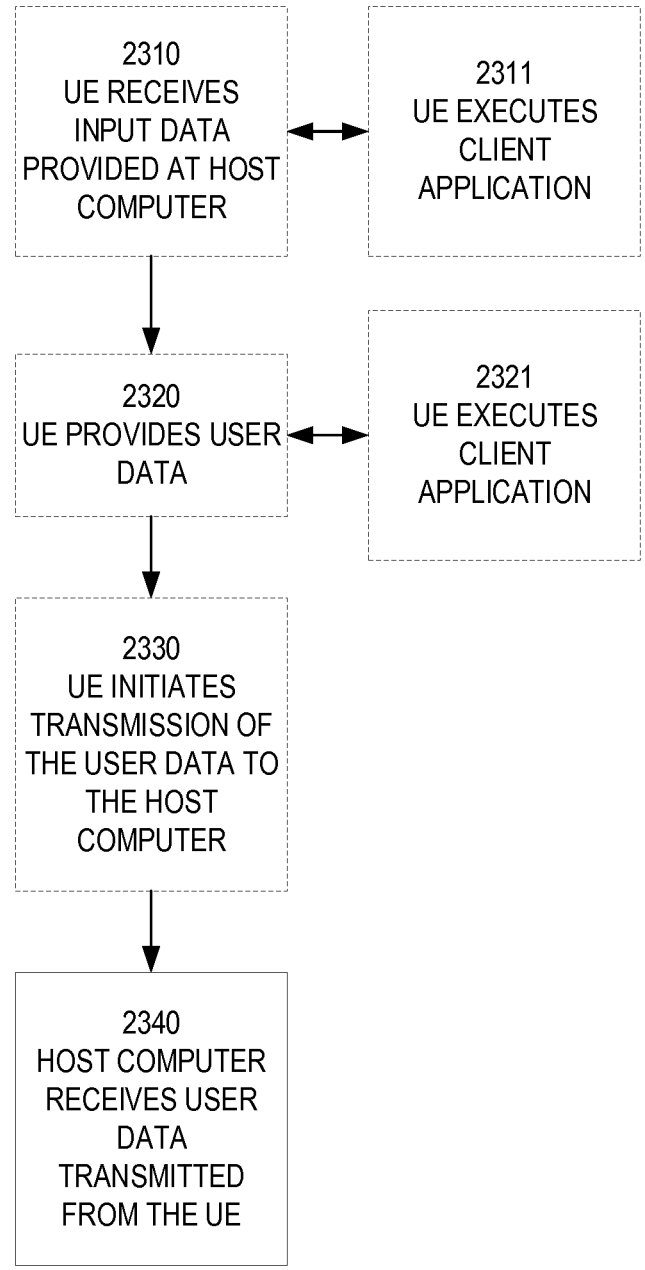

FIG. 18 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 18 will be included in this section. In step 2310 (which may be optional), the UE receives input data provided by the host computer. Additionally or alternatively, in step 2320, the UE provides user data. In substep 2321 (which may be optional) of step 2320, the UE provides the user data by executing a client application. In substep 2311 (which may be optional) of step 2310, the UE executes a client application which provides the user data in reaction to the received input data provided by the host computer. In providing the user data, the executed client application may further consider user input received from the user. Regardless of the specific manner in which the user data was provided, the UE initiates, in substep 2330 (which may be optional), transmission of the user data to the host computer. In step 2340 of the method, the host computer receives the user data transmitted from the UE, in accordance with the teachings of the embodiments described throughout this disclosure.

Figure 19:
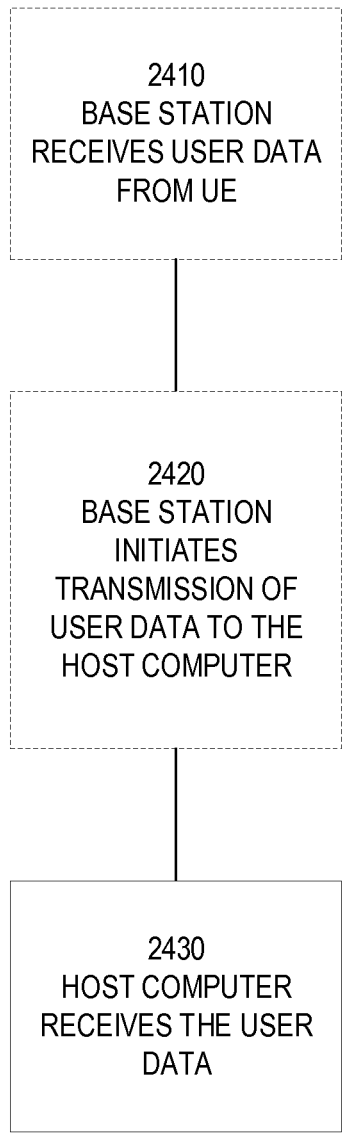

FIG. 19 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 19 will be included in this section. In step 2410 (which may be optional), in accordance with the teachings of the embodiments described throughout this disclosure, the base station receives user data from the UE. In step 2420 (which may be optional), the base station initiates transmission of the received user data to the host computer. In step 2430 (which may be optional), the host computer receives the user data carried in the transmission initiated by the base station.

In view of the above, embodiments of the present disclosure include a communication system including a host computer. The host computer comprises processing circuitry configured to provide user data. The host computer further comprises a communication interface configured to forward the user data to a cellular network for transmission to a user equipment (UE). The cellular network comprises a base station having a radio interface and processing circuitry. The base station's processing circuitry is configured to perform any of the steps of any of the base station embodiments described above.

In some embodiments, the communication system further includes the base station.

In some embodiments, the communication system further includes the UE, and the UE is configured to communicate with the base station.

In some embodiments, the processing circuitry of the host computer is configured to execute a host application, thereby providing the user data, and the UE comprises processing circuitry configured to execute a client application associated with the host application.

Other embodiments include a method implemented in a communication system including a host computer, a base station and a user equipment (UE). The method comprises, at the host computer, providing user data. The method further comprises, at the host computer, initiating a transmission carrying the user data to the UE via a cellular network comprising the base station. The base station performs any of the steps of any of the base station embodiments described above.

In some embodiments, the method further comprises, at the base station, transmitting the user data.

In some embodiments, the user data is provided at the host computer by executing a host application, and the method further comprises, at the UE, executing a client application associated with the host application.

Other embodiments include a UE configured to communicate with a base station. The UE comprises a radio interface and processing circuitry configured to perform any of the methods performed at the host computer described above.

Other embodiments include a communication system including a host computer. The host computer comprises processing circuitry configured to provide user data. The host computer further comprises a communication interface configured to forward user data to a cellular network for transmission to a UE. The UE comprises a radio interface and processing circuitry. The UE's components are configured to perform any of the steps of any of the UE embodiments discussed above.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Other embodiments include a method implemented in a communication system including a host computer, a base station, and a UE. The method comprises, at the host computer, providing user data. The method further comprises, at the host computer, initiating a transmission carrying the user data to the UE via a cellular network comprising the base station. The UE performs any of the steps of any of the UE embodiments discussed above.

In some embodiments, the method further comprises, at the UE, receiving the user data from the base station.

Other embodiments include a communication system that includes a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the UE embodiments discussed above.

In some embodiments, the communication system further includes the UE.

In some embodiments, the communication system further includes the base station. The base station comprises a radio interface configured to communicate with the UE and a communication interface configured to forward to the host computer the user data carried by a transmission from the UE to the base station.

In some embodiments, the processing circuitry of the host computer is configured to execute a host application, and the UE's processing circuitry is configured to execute a client application associated with the host application, thereby providing the user data.

In some embodiments, the method further comprises the processing circuitry of the host computer is configured to execute a host application, thereby providing request data, and the UE's processing circuitry is configured to execute a client application associated with the host application, thereby providing the user data in response to the request data.

Other embodiments include a method implemented in a communication system including a host computer, a base station, and a UE. The method comprises, at the host computer, receiving user data transmitted to the base station from the UE. The UE performs any of the steps of any of the UE embodiments discussed above.

In some embodiments, the method further comprises, at the UE, providing the user data to the base station.

In some embodiments, the method further comprises, at the UE, executing a client application, thereby providing the user data to be transmitted, and at the host computer, executing a host application associated with the client application.

In some embodiments, the method further comprises, at the UE, executing a client application, and at the UE, receiving input data to the client application. The input data is provided at the host computer by executing a host application associated with the client application. The user data to be transmitted is provided by the client application in response to the input data.

Other embodiments include a communication system including a host computer comprising a communication interface configured to receive user data originating from a transmission from a user equipment (UE) to a base station. The base station comprises a radio interface and processing circuitry. The base station's processing circuitry is configured to perform any of the steps of any of the base station embodiments discussed above.

In some embodiments, the communication system further includes the base station.

In some embodiments, the communication system further includes the UE. The UE is configured to communicate with the base station.

In some embodiments, the processing circuitry of the host computer is configured to execute a host application, and the UE is configured to execute a client application associated with the host application, thereby providing the user data to be received by the host computer.

Other embodiments include a method implemented in a communication system including a host computer, a base station, and a UE. The method comprises, at the host computer, receiving, from the base station, user data originating from a transmission which the base station has received from the UE. The UE performs any of the steps of any of the UE embodiments discussed above.

In some embodiments, the method further comprises, at the base station, receiving the user data from the UE.

In some embodiments, the method further comprises, at the base station, initiating a transmission of the received user data to the host computer.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The invention claimed is:

1. A method of data transmission performed by a wireless device, the method comprising:
  receiving, from a base station, system information comprising information elements specifying a configuration of a Physical Random Access Channel (PRACH) or Narrowband PRACH, the information elements comprising a plurality of Boolean flags, each Boolean flag corresponding to a respective coverage enhancement level and indicating whether or not, at the corresponding coverage enhancement level, the wireless device is permitted to transmit respective blocks of data during and after a random access procedure;
  performing the random access procedure to the base station; and
  responsive to the plurality of Boolean flags comprising a Boolean flag indicating that the transmitting of the respective blocks of data during and after the random access procedure is permitted, transmitting a first block of data, stored at the wireless device, to the base station during the random access procedure while withholding a second block of data, stored at the wireless device, from transmission to the base station until after completion of the random access procedure.

2. The method of claim 1, further comprising selecting a random access preamble that indicates to the base station that the wireless device will perform the transmitting during the random access procedure.

3. The method of claim 1, wherein:
  the system information further indicates a maximum transmission block size for the transmitting; and
  the transmitting is further responsive to determining that the first and second blocks of data are collectively larger than the maximum transmission block size.

4. The method of claim 1, further comprising:
  during the random access procedure, transmitting a size of the second block of data to the base station; and
  responsive to the transmitting of the size of the second block during the random access procedure, receiving instruction from the base station to proceed directly to an RRC_CONNECTED state upon completing the random access procedure.

5. A method of receiving data, during a random access procedure, performed by a base station, the method comprising:
  transmitting, to a wireless device, system information comprising information elements specifying a configuration of a Physical Random Access Channel (PRACH) or Narrowband PRACH, the information elements comprising a plurality of Boolean flags, each Boolean flag corresponding to a respective coverage enhancement level and indicating whether or not, at the corresponding coverage enhancement level, the wireless device is permitted to transmit respective blocks of data during and after the random access procedure, the plurality of Boolean flags comprising a Boolean flag that indicates, to the wireless device, that the wireless device is permitted to transmit the respective blocks of data during and after the random access procedure;
  responsive to the transmitting, receiving the respective blocks of data during and after the random access procedure.

6. The method of claim 5, further comprising receiving a random access preamble from the wireless device that indicates to the base station that the wireless device transmit the blocks of data during and after the random access procedure, respectively.

7. The method of claim 5, wherein the system information further indicates a maximum transmission block size for the block of data received during the random access procedure, and the first and second blocks of data are collectively larger than the maximum transmission block size.

8. The method of claim 5, further comprising:
  during the random access, receiving a size of the block of data to be received after the random access procedure; and
  responsive to the receiving of the size of the second block during the random access, instructing the wireless device to proceed directly to an RRC_CONNECTED state upon completing the random access procedure.

9. A wireless device comprising:
a processor and a memory, the memory containing instructions executable by the processor whereby the wireless device is configured to:
receive, from a base station, system information comprising information elements specifying a configuration of a Physical Random Access Channel (PRACH) or Narrowband PRACH, the information elements comprising a plurality of Boolean flags, each Boolean flag corresponding to a respective coverage enhancement level and indicating whether or not, at the corresponding coverage enhancement level, the wireless device is permitted to transmit respective blocks of data during and after a random access procedure; and
perform the random access procedure to the base station; and
responsive to the plurality of Boolean flags comprising a Boolean flag indicating that the transmitting of the respective blocks of data during and after the random access procedure is permitted, transmit a first block of data stored at the wireless device to the base station during the random access procedure while withholding a second block of data stored at the wireless device from transmission to the base station until after completion of the random access procedure.

10. The wireless device of claim 9, wherein execution of the instructions by the processor further configures the wireless device to select a random access preamble that indicates to the base station that the wireless device will perform the transmitting during the random access procedure.

11. The wireless device of claim 9, wherein:
the system information further indicates a maximum transmission block size for the transmitting; and
the transmitting is responsive to determining that the first and second blocks of data are collectively larger than the maximum transmission block size.

12. The wireless device of claim 9, wherein execution of the instructions by the processor further configures the wireless device to:
during the random access procedure, transmit a size of the second block of data to the base station; and
responsive to the transmitting of the size of the second block during the random access procedure, receive an instruction from the base station to proceed directly to an RRC_CONNECTED state upon completing the random access procedure.

13. A base station comprising:
a processor and a memory, the memory containing instructions executable by the processor whereby the base station is configured to:
transmit, to a wireless device, system information comprising information elements specifying a configuration of a Physical Random Access Channel (PRACH) or Narrowband PRACH, the information elements comprising a plurality of Boolean flags, each Boolean flag corresponding to a respective coverage enhancement level and indicating whether or not, at the corresponding coverage enhancement level, the wireless device is permitted to transmit respective blocks of data during and after a random access procedure, the plurality of Boolean flags comprising a Boolean flag that indicates, to the wireless device, that the wireless device is permitted to transmit the respective blocks of data during and after random access procedure;
responsive to the transmitting, receive the respective blocks of data during and after the random access procedure.

14. The base station of claim 13, wherein execution of the instructions by the processor further configures the base station to receive a random access preamble from the wireless device that indicates to the base station that the wireless device transmit the blocks of data during and after the random access procedure, respectively.

15. The base station of claim 13, wherein the system information further indicates a maximum transmission block size for the block of data received during the random access procedure, and the first and second blocks of data are collectively larger than the maximum transmission block size.

16. The base station of claim 13, wherein execution of the instructions by the processor further configures the base station to:
during the random access, receive a size of the block of data to be received after the random access procedure; and
responsive to the receiving of the size of the second block during the random access, instruct the wireless device to proceed directly to an RRC_CONNECTED state upon completing the random access procedure.

* * * * *